United States Patent [19]
Brodsky et al.

[11] Patent Number: 5,398,756
[45] Date of Patent: Mar. 21, 1995

[54] IN-SITU REMEDIATION OF CONTAMINATED SOILS

[75] Inventors: Philip H. Brodsky; Sa V. Ho, both of Creve Coeur, Mo.

[73] Assignee: Monsanto Company, St. Louis, Mo.

[21] Appl. No.: 149,828

[22] Filed: Nov. 17, 1993

Related U.S. Application Data

[63] Continuation-in-part of Ser. No. 20,315, Feb. 19, 1993, abandoned, which is a continuation-in-part of Ser. No. 989,674, Dec. 14, 1992, abandoned.

[51] Int. Cl.$^6$ ............................................. F21B 43/22
[52] U.S. Cl. ................................. 166/248; 204/130; 405/128
[58] Field of Search .................. 166/248, 246; 204/180.5, 181.1, 181.9, 130; 405/128, 129; 588/249–259

[56] References Cited

U.S. PATENT DOCUMENTS

| | | |
|---|---|---|
| 3,458,442 | 7/1969 | Floyd et al. |
| 4,067,389 | 1/1978 | Savins |
| 4,378,845 | 4/1983 | Medlin et al. |
| 4,678,554 | 7/1987 | Oppitz ...................... 204/180.1 X |
| 4,850,745 | 7/1989 | Hafer et al. ................. 405/128 X |
| 4,964,466 | 10/1990 | Williams |
| 5,009,797 | 4/1991 | Penny et al. |
| 5,057,227 | 10/1991 | Cohen |
| 5,061,119 | 10/1991 | Balthaus et al. ............... 405/128 |
| 5,074,986 | 12/1991 | Probstein et al. |
| 5,098,538 | 3/1992 | Kim et al. |
| 5,106,233 | 4/1992 | Breaux |
| 5,135,058 | 8/1992 | Millgard et al. |
| 5,137,608 | 8/1992 | Acar et al. |
| 5,173,164 | 12/1992 | Egen et al. ................... 204/180.1 X |
| 5,181,796 | 1/1993 | DeYoung |
| 5,193,934 | 3/1993 | Johnson et al. |

FOREIGN PATENT DOCUMENTS

| | | |
|---|---|---|
| 312174A1 | 4/1989 | European Pat. Off. |
| 0504551 | 1/1992 | European Pat. Off. |
| WO91/01392 | 2/1991 | WIPO |
| WO91/08176 | 6/1991 | WIPO |
| WO92/06802 | 4/1992 | WIPO |
| WO92/19545 | 11/1992 | WIPO |
| WO92/19556 | 11/1992 | WIPO |

OTHER PUBLICATIONS

Lageman, et al, "Electro-Reclamation: Theory and Practice", Chemistry and Industry, No. 18, Sep. 18, 1989, London GB, pp. 585–590.

Acar, Y. B., "Electrokinetic Cleanups", Civil Eng., Oct. 1992, pp. 58–60.

Acar, Y. B., "Phenol Removal from Kaolinite by Electrokinetics", J. Geotechnical Eng., vol. 118, No. 11, pp. 1837–1852 (Nov. 1992).

Segall, B. A. et al "Electroosmotic Contaminant-Removal Processes", J. Environmental Eng., vol. 118, No., pp. 84–100 (Jan./Feb. 1992).

Bruell, C. J., "Electroosmotic Removal of Gasoline Hydrocarbons and TCE from Clay", J. Environmental Eng., vol. 118, No. 1, pp. 68–83 (Jan./Feb. 1992).

Acar, Y. B. et al., "Electrochemical Processing of Soils: Theory of pH Gradient Development by Diffusion, Migration, and Linear Convection", J. Environ. Sci. Health, A25(6), pp. 687–714 (1990).

(List continued on next page.)

Primary Examiner—William P. Neuder
Attorney, Agent, or Firm—Kenneth D. Goetz; Paul L. Passley; James C. Bolding

[57] ABSTRACT

A process for the in-situ remediation of contaminated soil comprising: (a) forming at least one liquid permeable region within a contaminated soil region, (b) introducing material for treating contaminants in the contaminated soil region into the liquid permeable regions to form at least one treating zone within the contaminated soil region, and (c) transmitting direct electric current through the contaminated soil region between a first electrode and a second electrode having opposite charge, wherein the first electrode is located at a first end of the contaminated soil region and the second electrode is located at the opposite end of the contaminated soil region to cause an electroosmotic flow from the second to the first electrode.

41 Claims, 5 Drawing Sheets

OTHER PUBLICATIONS

Corapcioglu, M. Y., "Formation of Electro—Chemico–Osmotic Processes in Soils", *Transport in Porous Media*, 6, pp. 435–444 (1991).

U.S. Environmental Protection Agency-Office of Research and Development, "Hydraulic Fracturing to Enhance Elimination in the Subsurface Soil by Vapor Extraction or Bioremediation", Risk Reduction Engineering Laboratory-Cincinnati, Ohio, pp. 28–29 (Sep. 1992).

Davis–Hoover, W., U.S. Environmental Protection Agency-Office of Solid Waste and Emergency Response, "Hydraulic Fracturing Enhances In Situ Remediation:", *Groundwater Currents*, pp. 1,4 (Sep. 1992).

Steimle, R., U.S. Environmental Protection Agency-Office of Solid Waste and Emergency Response, "In Situ Groundwater Treatment Research and Demos Inventoried:", *Groundwater Currents*, pp. 2,4 (Sep. 1992).

O'Hannesin, S. F. and Gillham, R. W., "A Permeable Reaction Wall for In Situ Degradation of Halogenated Organic Compounds", paper presented at the 45th Canadian Geotechnical Society Conference, Toronto, Ontario, Oct. 25–28, 1992.

Waterloo Groundwater control Technologies, "Waterloo Barrier", technical brochure.

envirometal technologies, Inc., "the envirometal process—metal-enhanced abiotic degradation of chlorinated organic compounds", technical brochure.

McLaren Hart/Accutech Remedial Systems, "Pneumatic Fracturing, Extraction and Hot Gas Injection", technical brochure.

Alshawabkeh, A. N. et al., "Removal of Contaminants from Soils by Electrokinetics: A Theoretical Treatise", *J. Environ. Sci. Health*, Part A. A27(7), pp. 1835–1861 (1992).

Murdoch, L. et al., "Technologies of Delivery or Recovery for the Remediation of Hazardous Waste Sites", U.S. Environmental Protection Agency—Office of Research and Development, Risk Reduction Engineering Laboratory—Cincinnati, Ohio, pp. 1–90 (Jan. 1990).

Sanning, D. E. et al., "NATO/CCMS Pilot Study Demonstration of Cleanup Technologies for Contaminated Soils and Groundwater. The Newest Results", Altlastensanierung 90, Int. KfK/TNO Kongr., 3rd, Meeting Date 1990, pp. 963–972 (1991).

Lageman, R. et al., "Electro–Treatment: State of the Art and Future Developments:", Altlastensanierung 90, Int. KfK/TNO Kongr., 3rd. meeting Date 1990, pp. 1197–1204 (1991).

Murdoch, L. C. et al., "Hydraulic Fracturing for Increasing Fluid Flow in the Ground", Altlastensanierung 90, Int. KfK/TNO Kongr., 3rd, Meeting Date 1990, pp. 1217–1226 (1991).

Shapiro, A. P. and Probstein, R. F., "Removal of Contaminants From Saturated Clay Electroosmosis", *Environ. Sci. Technol.*, vol. 27, pp. 281–291 (1993).

Murdoch, L., "Some Recent Developments in Delivery and Recovery Hydraulic Fracturing and Directional Drilling", *Proceedings of ETEX '92–The 2nd Annual Environmental Technology Exposition and Conference*, Washington, D.C., Apr. 7–9, 1992, pp. 1–13.

Davis–Hoover, W. J. et al., "Hydraulic Fracturing to Improve Nutrient and Oxygen Delivery for In Situ Bioreclamation", In Situ Bioreclamation—Applications and Investigations for Hydrocarbon and Contaminated Site Remediation, Edited by R. E. Hinchee and R. F. Olfenbuttel, Butterworth–Heinmann (1991), pp. 67–82.

Murdoch, L. C., "Hydraulic and Impulse Fracturing Techniques to Enhance the Remediation of Low Permeability Soils", Center for GeoEnvironmental Research Center Hill Research Facility, University of Cincinnati—this document is a draft version that was presented to Monsanto Co. during a meeting with the EPA in Mar. 1993.

Vesper, S. et al., "The Use of Hydraulic Fracturing to Enhance In Situ Bioremediation", Eighteenth Annual Risk Reduction Engineering Laboratory Research Symposium, Apr. 1992, pp. 59–61.

Murdoch, L. C. et al., "Hydraulic Fracturing to Increase Fluid Flow", F. Arendt, M. Hinsenveld and W. J. van den Brink (eds.), Contaminated Soil '90, pp. 1087–1094, Kluwer, Academic Publishers.

Murdoch, L. C. et al., "Feasibility of Hydraulic Fracturing of Soil to Remedial Actions", EPA Project Summary, Risk Reduction Engineering Laboratory, Aug. 1991.

Murdoch, L. C., "A Field Test of Hydraulic Fracturing in Glacial Till", Proceedings of the Fifteenth Annual Research Symposium, Cincinnati, Ohio Apr. 10–12, 1989, pp. 164–174.

(List continued on next page.)

OTHER PUBLICATIONS

Handbook on "In Situ Treatment of Hazardous Waste-Contaminated Soils", EPA Risk Reduction Engineering Laboratory, Jan. 1990, pp. 96–97.

Probstein, R. F. et al., "Removal of Contaminants from Soils by Electric Fields", *Science*, vol. 260, pp. 498–503, Apr. 23, 1993.

Murdoch, L. et al., "Directional Drilling", Center Hill technical brochure, U.S. EPA Center Hill Facility for Solid and Hazardous Waste Treatment.

Murdoch, L. et al., "Innovative Delivery and Recovery: Hydraulic and Impulse Fracturing to Facilitate Remediation", Center Hill technical brochure, U.S. EPA Center Hill Facility and Research Facility for Solid and Hazardous Waste Treatment.

Vesper, S. et al., "Understanding and Performing In Situ Bioremediation", Center Hill technical brochure, U.S. EPA Center Hill Facility and Research Facility for Solid and Hazardous Waste Treatment.

Olsen, R. L. et al., "Can Groundwater Restoration Be Acheived?", *Water Environment & Technology*, Mar. 1993, pp.42–47.

Cabrera-Guzmán, D. et al., "The Use of Electrokinetics for Hazardous Waste Site Remediation", *J. Air Waste Manage. Assoc.*, 40: 1670–76 (1990).

Li, H. and Gale, R. J., "Hydraulic and Electroosmotic Flow through Silica Capillaries", *Langmuir*, 9, 1150–565 (1993).

Renaud, P. C. and Probstein, R. F., "Electroosmotic Control of Hazardous Wastes", *PCH PhysicoChemical Hydrodynamics*, 9 (1–2), 345–60 (1987).

Horng, J. J. et al., "Evaluating Electrokinetics as a Remedial Action Technique", U.S. Environ. Prot. Agency, Res. Dev., EPA Report No. EPA/600-/9-87/018F, Proc.: 2nd Int. Conf. New Front. Hazard. Waste Manage., pp. 65–77 (Sep. 27–30, 1987).

Workshop on Electro-kinetic Treatment and its Application in Environmental-Geotechnical Engineering for Hazardous Waste Site Remediation, Unpublished Proceedings, University of Washington, Dept. of Civil Engineering, Seattle, Wash., Aug. 4–5, 1986.

Haggin, J., "Microbially Based Treatment Process Removes Toxic Metals, Radionuclides", *C&EN*, vol. 70, No. 30, pp. 35–36 (Jul. 27, 1992).

McMurty, D. C. and Elton, R. O., "New Approach to In-Situ Treatment of Contaminated Groundwaters", *Environmental Progress*, vol. 4, No. 3, pp. 168–170 (Aug., 1985).

Lageman, R., "Electroreclamation: Applications in the Netherlands", *Environ. Sci. Technol.*, vol. 27, No. 13, pp. 2648–2650 (1993).

Gadd, G. M., "Accumulation of Metals by Microorganisms and Algae", Biotechnology–Special Microbial Processes, vol.6, Chapter 13, pp. 401–23, eds. Rehm, H. J. and Reed, G. (1988).

Runnells, D. D. and Wahli, C., "In Situ Electromigration as a Method for Removing Sulfate, Metals, and Other Contaminants from Ground Water", *GroundWater Monit. Rev.*, pp. 121–129 (Winter 1993).

Hamed, J. et al., "Pb(II) Removal from Kaolinite by Electrokinetics", *Journal of Geotechnical Engineering*, ASCE, vol. 117, No. 2, pp. 241–271 (Feb. 1991).

Al-Abed, S. R. et al., "Metal Speciation Research", Center Hill technical brochure, U.S. EPA Center Hill Facility and Research Facility for Solid and Hazardous Waste Treatment.

Slack, Bill et al., "Mobility of Metals in Soils", Center Hill technical brochure, U.S. EPA Center Hill Facility and Research Facility for Solid and Hazardous Waste Treatment.

Puls, R. W. et al., "Innovative Remediation of Chromium", *Groundwater Currents*, p. 2 (1993).

Runnells, D. D. and Larson, J. L., "A Laboratory Study of Electromigration as a Possible Field Technique for the Removal of Contaminants from Ground Water", *Ground Water Monit. Rev.*, vol. 6, No. 3, pp. 85–91 (Summer 1986).

McCullough, M. L. and Dagdigian, J. V., "Evaluation of Remedial Options for Treatment of Heavy Metal and Petroleum Hydrocarbon Contaminated Soil", *Remediation*, pp. 265–286 (Summer 1993).

Lageman, R. et al., "Electro-Reclamation: State-of-the-Art", pp. 1–12.

IN-SITU REMEDIATION OF CONTAMINATED SOILS

This application is a continuation-in-part of U.S. Ser. No. 08/020,315, filed Feb. 19, 1993, which is a continuation-in-part of U.S. Ser. No. 07/989,674, filed Dec. 14, 1992, both now abandoned.

BACKGROUND OF THE INVENTION

This invention relates to in-situ remediation of contaminated soils. In one aspect, this invention relates to a novel process combining formation of a liquid permeable re,on, electroosmosis and/or electromigration and treatment of contaminants using biological, physicochemical or electrochemical means. In a further aspect, this invention relates to a novel process for the in-situ remediation of soils contaminated with toxic organic compounds and/or toxic ionic contaminants such as metals and radionuclides.

Generally, degradation of toxic organic compounds to innocuous products such as $CO_2$ and water can be accomplished either biologically or physicochemically provided the treatment is carried out in a well-controlled environment in which key operating parameters such as temperature, pressure, mixing, addition of the reactants or nutrients, etc. are optimized. Examples of these technologies include incineration and its variations, supercritical water oxidation, $UV/H_2O_2$/ozone/ catalytic oxidation, reductive dehalogenation and biodegradation in an optimized bioreactor. However, the costs associated with these technologies are high for the decontamination of soil, which must first be excavated and then processed into a fore suitable for the particular reactor used. The reactor constitutes a major portion of the overall cost in these processes due to either the extreme conditions required with thermal approaches or the very long holding times required in biological approaches. To overcome these problems, destruction of the contaminants needs to be done in-situ to avoid the cost and complications associated with excavation and handling, and the process has to be energy efficient and mild to minimize capital and operating costs.

Various techniques have been suggested for application in processes for the in-situ remediation of soils contaminated with toxic organic compounds. Examples of such techniques include hydraulic fracturing, also referred to as hydrofracturing, and electroosmosis. However, these techniques as currently practiced suffer from limitations which make them commercially impractical.

Hydraulic fracturing is an established oil field technology for increasing the production rates of oil or gas wells which has recently been adapted by the Environmental Protection Agency (EPA) Risk Reduction Engineering Laboratory as a method to access subsurface soils for remediation purposes. See EPA Groundwater Currents, Office of Solid Waste and Emergency Response Technology Innovation Office, September 1992. While this technique is of little utility as a remediation technique by itself, it has potential for enhancing other remedial technologies such as vapor extraction, steam stripping, soil washing, and especially bioremediation. A major problem with the use of hydraulic fracturing, however, involves its use with contaminated fine-grained soils such as clayey or silty soils. These soils have such low permeabilities that it is not possible for liquids to be pumped through uniformly by hydraulic means. Therefore, contaminants in these soils remain poorly accessible.

Electrokinetics, specifically electroosmosis, is another technique which has been suggested for use in in-situ remediation of soils contaminated with non-ionic, soluble organic compounds. Electroosmosis involves applying an electrical potential between two electrodes immersed in soil to cause water in the soil matrix to move from the anode to the cathode when soils are negatively charged, such as is the case with clayey soils. When the soil is positively charged, however, the direction of flow would be from the cathode to the anode. The technique has been used since the 1930's for removing water from clays, silts and fine sands. The major advantage for electroosmosis as an in-situ remediation method for difficult media, e.g. clay and silty sand, is its inherent ability to get water to flow uniformly through day and silty sand at 100 to 1000 times faster than attainable by hydraulic means, and with very low energy usage. Electroosmosis has two major limitations as currently practiced that makes it impractical for actual field remediation. First, the liquid flow induced by electroosmosis is extremely slow, i.e. about one inch per day for clayey soils, which could result in a cumbersome and very long-term operation in large-scale operations. Second, several laboratory studies (see Bruell, C. J. et al., "Electroosmotic Removal of Gasoline Hydrocarbons and TCE from Clay", *J. Environ. Eng.*, Vol. 118, No. 1, pp. 68–83, January/February 1992 and Segall, B. A. et al., "Electroosmotic Contaminant-Removal Processes", *J. Environ. Eng.*, Vol. 118, No. 1, pp. 84–100, January/February 1992) have indicated that part of the soil bed became dry after approximately one month under the electroosmotic effect, resulting in reduced flow and the eventual stoppage of the process. Another laboratory study (see Shapiro, A. P. et al., "Removal of Contaminants From Saturated Clay by Electroosmosis", *Environ. Sci. Technol.*, Vol. 27, No. 2, pp. 283–91, 1993) has indicated that the acid generated at the anode moves through the soil bed in the direction of the cathode and results in reduced electroosmotic flow and eventual stoppage of the process.

Several techniques have been suggested for application in processes for the remediation of soils contaminated with ionic contaminants such as heavy metals and radionuclides. Ex-situ techniques, e.g. separation, involves removing the soil containing ionic contaminants and treating the soil ex-situ to remove contaminants. Examples of separation techniques include soil washing and extraction. However, ex-situ methods are not commercially practical due to economic considerations resulting from the required excavation and treatment of the contaminated soil. In situ methods include electromigration and immobilization.

Electrokinetics, specifically electromigration, involves applying an electrical potential between two electrodes immersed in soil to cause solute, e.g. ions of metals, to migrate through a solution along the imposed voltage gradient, i.e. electromigratory movement. The charged species of metals in the soil migrate toward the oppositely charged electrodes and are collected at the electrodes. Electromigration has several limitations as currently practiced that make it difficult for actual field remediation. First, pH of the solution near the cathode tends to be very alkaline due to water electrolysis at the electrode and this causes most metals to precipitate in the soil making it difficult to remove the contaminants as well as blocking the flow of water through the contaminated soil region. Second, electrokinetics is inherently not a very stable process due to build-up of concentration, pH and osmotic gradients in the soil between the electrodes which adversely affect the process. In addition, the soil itself will also be altered over time, e.g. the soil will suffer from drying and cracking.

Immobilization encapsulates the contaminant in a solid matrix. Traditional immobilization options for heavy metal contaminated soil are solidification/stabilization (S/S) and vitrification. Traditional S/S methods produce monolithic blocks of waste with high structural integrity. However, the presence of hydrocarbons interfere with the S/S matrix and can increase the leachability of heavy metals when metals partition into the organic phase. Vitrification involves heating the contaminated soil to form chemically inert materials, e.g. glass. In vitrification, large electrodes are inserted into soil that contains significant levels of silicates. An electrical current is applied and the heat generated melts the soil and contaminants gradually working downward through the soil. The contaminants in the fused soil are not likely to leach. However, neither immobilization or vitrification is an economical commercial process.

Soil contaminated with toxic organic compounds and heavy metals and/or radionuclides present additional problems since remedial schemes for one type of contamination are often inappropriate for the other. For example, traditional remediation techniques for organic compounds such as bioremediation, incineration and thermal desorption are generally ineffective on heavy metals. In addition, the presence of most heavy metals can have toxic effects on microorganisms utilized to degrade organic contaminants. Treatment of mixed waste contamination typically requires a combination of various methods resulting in higher costs which are unacceptable.

An in-situ remediation process for single or mixed waste contamination remediation which is commercially practical and economical, and solves the above-described problems with the currently known technologies would be highly desirable. It has now been found that a combination of a method for forming a liquid permeable region, electrokinetics and degradation of contaminants using biological, physicochemical or electrochemical means solves the above-described problems.

SUMMARY OF THE INVENTION

It is an object of the invention to provide a process for the in-situ remediation of contaminated soil. It is a further object of the invention to provide a commercially practical and economical process for the in-situ remediation of contaminated soil. It is yet a further object of the invention to provide a process for the in-situ remediation of contaminated soil which is particularly well suited for use with clayey or silty soils. It is a still further object of the invention to provide a process for the in-situ remediation of contaminated soil which does not suffer from the current problems associated with the use of electrokinetics, hydraulic fracturing and biological or physicochemical degradation.

According to the invention, a process for the in-situ remediation of soil is provided which comprises forming at least one liquid permeable region within a contaminated soil region; introducing material for treating contaminants in the contaminated soil region into the liquid permeable regions to form at least one treating zone within the contaminated soil region; and transmitting direct electric current through the contaminated soil region between a first electrode and a second electrode having opposite charge, wherein the first electrode is located at a first end of the contaminated soil region and the second electrode is located at the opposite end of the contaminated soil region (1) to cause an electroosmotic flow from the second electrode to the first electrode, (2) to cause an electromigratory movement of ionic contaminants in a direction toward the electrode of opposite charge, or (3) to cause an electroosmotic flow from the second electrode to the first electrode and an electromigratory movement of ionic contaminants in a direction toward the electrode of opposite charge.

In one embodiment, the electrical polarity is periodically reversed to reverse the direction of movement of contaminants through the treating zones. In another embodiment, water from the electroosmotic flow is recycled in the direction from the first electrode to the second electrode. In still another embodiment, the electrical polarity is periodically reversed to reverse the direction of movement of contaminants through the treating zones and water from the electroosmotic flow is recycled in the direction from the first electrode to the second electrode. In yet another embodiment, a first liquid which comprises water is supplied to the contaminated soil region wherein the direct electric current causes the first liquid to flow by electroosmosis in a direction from the second electrode to the first electrode. In the embodiment where the first liquid is supplied to the contaminated soil region, the electrical polarity can be reversed or the electroosmotic flow can be recycled or both.

Further according to the invention, a process for the in-situ remediation of soil is provided which comprises introducing material for treating contaminants in a contaminated soil region into at least one existing liquid permeable region within the contaminated soil region to form at least one treating zone within the contaminated soil region, and transmitting direct electric current through the contaminated soil region between a first electrode and a second electrode having opposite charge, wherein the first electrode is located at a first end of the contaminated soil region and the second electrode is located at the opposite end of the contaminated soil region (1) to cause an electroosmotic flow from the second electrode to the first electrode, (2) to cause an electromigratory movement of ionic contaminants in a direction toward the electrode of opposite charge, or (3) to cause an electroosmotic flow from the second electrode to the first electrode and an electromigratory movement of ionic contaminants in a direction toward the electrode of opposite charge.

In one embodiment, the electrical polarity is periodically reversed to reverse the direction of movement of contaminants through the treating zones. In another embodiment, water from the electroosmotic flow is recycled in the direction from the first electrode to the second electrode. In still another embodiment, the electrical polarity is periodically reversed to reverse the direction of movement of contaminants through the treating zones and water from the electroosmotic flow is recycled in the direction from the first electrode to the second electrode. In yet another embodiment, a first liquid which comprises water is supplied to the contaminated soil region wherein the direct electric current causes the first liquid to flow by electroosmosis in a direction from the second electrode to the first electrode. In the embodiment where the first liquid is supplied to the contaminated soil region, the electrical polarity can be reversed or the electroosmotic flow can be recycled or both.

Still further according to the invention, a process for the in-situ remediation of soil is provided which comprises transmitting direct electric current through the contaminated soil region between a first electrode and a second electrode having opposite charge, wherein the first electrode is located at a first end of the contaminated soil region and the second electrode is located at the opposite end of the contaminated soft region from the first electrode (1) to cause an electroosmotic flow from the second electrode to the first electrode, (2) to cause an electromigratory movement of ionic contaminants in a direction toward the electrode of opposite charge, or (3) to cause an electroosmotic flow from the second electrode to the first electrode and an electromigratory movement of ionic contaminants in a direction toward the electrode of opposite charge, wherein the contaminated soil region contains at least one existing liquid permeable region and the at least one existing liquid permeable region contains existing treating materials; and periodically reversing the polarity of the first and second electrodes to reverse the direction of movement of the contaminants through the existing treating zones. In one embodiment, the electroosmotic flow is recycled in the direction opposite the electroosmotic flow.

DETAILED DESCRIPTION OF THE INVENTION

Figure 1:
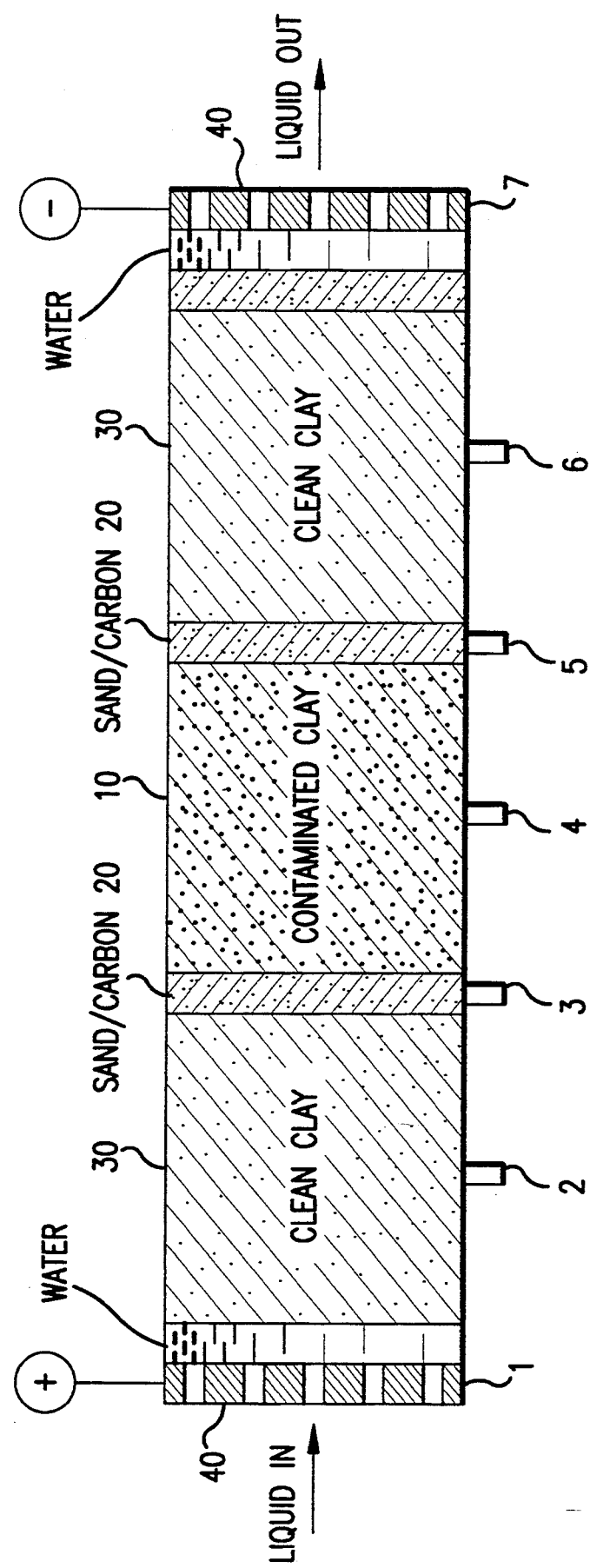
FIG. 1 is a view of the electroosmotic cell set-up used in Examples 1 and 2 under normal polarity.

A first embodiment of the invention relates to process for the in-situ remediation of contaminated soil comprising: (a) forming at least one liquid permeable region within a contaminated soil region, (b) introducing material for treating contaminants in the contaminated soil region selected from the group consisting of microorganisms, nutrients, electron acceptors, catalysts, adsorbents, surfactants, electron donors, co-metabolites, chelating agents, ion exchange resins, buffers, salts and combinations thereof, into the liquid permeable regions to form at least one treating zone within the contaminated soil region, and (c) transmitting direct electric current through the contaminated soil region between a first electrode and a second electrode having opposite charge, wherein the first electrode is located at a first end of the contaminated soil region and the second electrode is located at the opposite end of the contaminated soil region (1) to cause an electroosmotic flow from the second electrode to the first electrode, (2) to cause an electromigratory movement of ionic contaminants in a direction toward the electrode of opposite charge, or (3) to cause an electroosmotic flow from the second electrode to the first electrode and an electromigratory movement of ionic contaminants in a direction toward the electrode of opposite charge.

A second embodiment of the invention relates to a process for the in-situ remediation of contaminated soil comprising: (a) introducing material for treating contaminants in a contaminated soil region selected from the group consisting of microorganisms, nutrients, electron acceptors, catalysts, adsorbents, surfactants, electron donors, co-metabolites, chelating agents, ion exchange resins, buffers, salts and combinations thereof, into at least one existing liquid permeable region within the contaminated soil region to form at least one treating zone within the contaminated soil region, and (b) transmitting direct electric current through the contaminated soil region between a first electrode and a second electrode having opposite charge, wherein the first electrode is located at a first end of the contaminated soil region and the second electrode is located at the opposite end of the contaminated soil region (1) to cause an electroosmotic flow from the second electrode to the first electrode, (2) to cause an electromigratory movement of ionic contaminants in a direction toward the electrode of opposite charge, or (3) to cause an electroosmotic flow from the second electrode to the first electrode and an electromigratory movement of ionic contaminants in a direction toward the electrode of opposite charge.

A third embodiment of the invention relates to a process for the in-situ remediation of contaminated soil comprising: (a) transmitting direct electric current through the contaminated soil region between a first electrode and a second electrode having opposite charge, wherein the first electrode is located at a first end of the contaminated soil region and the second electrode is located at the opposite end of the contaminated soil region from the first electrode (1) to cause an electroosmotic flow from the second electrode to the first electrode, (2) to cause an electromigratory movement of ionic contaminants in a direction toward the electrode of opposite charge, or (3) to cause an electroosmotic flow from the second electrode to the first electrode and an electromigratory movement of ionic contaminants in a direction toward the electrode of opposite charge, wherein the contaminated soil region contains at least one existing liquid permeable soil region and the at least one existing liquid permeable region contains existing treating materials; and (b) periodically reversing the polarity of the first and second electrodes to reverse the direction of movement of the contaminants through the existing treating zones.

As used herein, the term "contaminated soil region" means a soil region containing organic compounds and/or ionic contaminants, such as metals and/or radionuclides, that has such low permeability that it is not possible for liquid to be pumped through uniformly by hydraulic means. Examples of such low permeability soils include, but are not limited to, clayey and silty soils. The contaminated soil region may, however, contain lenses or areas of high permeabilities, e.g. sand lenses.

As used herein, the term "electrokinetics" includes both electroosmosis and electromigration. The type of contaminants in the contaminated soil region and the physical and chemical characteristics of the contaminated soil region, e.g. pH, etc., will determine whether the transmission of direct electric current between the electrodes of opposite charge result in electroosmotic flow causing movement of non-ionic, soluble organic contaminants, electromigratory movement of ionic contaminants or both. The relative nature of electromigration compared to electroosmosis is such that the movement of ionic contaminants by electromigration is about 3-10 times faster than the flow caused by electroosmosis. In cases where both electroosmosis and electromigration occur, it is possible to utilize this difference to improve the efficiency of treating the organic and ionic contaminants by effecting the manner and rate at which they are treated in the treating zones.

In the embodiments of the invention which utilize the recycle of water in the direction opposite the direction of electroosmotic flow, alone or in combination with the reversal of electrode polarity technique, the water may be recycled by any conventional method known to those skilled in the art. Examples of such methods include, but are not limited to, pumping, utilization of a connecting pipe or tube between the electrodes of opposite charge, and, in the case of vertical electrodes near the surface, flooding the surface between the electrodes. It is currently preferred to recycle the liquid by having a connecting pipe or tube between the electrodes of opposite polarity to enable the hydraulic differential between the electrodes of opposite charge to move the water in the direction opposite the electroosmotic flow particularly when used in combination with reversal of electrode polarity to eliminate the need for duplicate equipment.

The currently preferred embodiments of the invention utilize the reversal of electrical polarity of the electrodes to eliminate the problems associated with extended electrokinetic operation.

The liquid permeable regions in the contaminated soil region can be formed by any conventional method known to those skilled in the art. As used herein, the term "liquid permeable regions" means a region that is permeable to liquid during electroosmosis and/or electromigration. The liquid permeable regions can be discrete regions or continuous regions of liquid permeability. As used herein, continuous liquid permeable regions means regions formed within the contaminated soil region which contain mixtures of soil and treating materials, wherein the soil or the treating materials can be the continuous phase. Examples of methods for forming discrete liquid permeable regions include, but are not limited to, hydrofracturing, pneumatic fracturing, impulse fracturing, directional drilling, sheet piling and trench formation. Trench formation, as used herein, includes slurry wall technology wherein the trench is filled with a slurry that contains material for treating the contaminant in the contaminated soil region provided that the slurry wall is permeable to the flow of liquid during the electroosmosis portion of the processes of the invention. An example of a method for forming a continuous liquid permeable region is soil drilling/mixing. In addition, the liquid permeable regions utilized in the invention can include existing liquid permeable regions within the contaminated soil region. An example of existing liquid permeable regions within tight soils are sandy regions that are commonly referred to as lenses. The currently preferred methods for forming discrete liquid permeable regions in deep contaminated soil regions are hydrofracturing and sheet piling. The currently preferred method for forming liquid permeable regions in shallow contaminated soil regions is trench formation.

In another embodiment of the processes of the invention when the organic and/or ionic contaminants are not degraded within the treating zones, i.e. when the contaminants are adsorbed or otherwise contained within the treating zones, the contaminants are recovered from the treating zones by any conventional method known to those skilled in the art including, but not limited to, extraction, flushing and physical recovery of the treating material, e.g. removable treating material such as porous sheet piling. The specific recovery method will depend on the type of treating material, method used to form the liquid permeable region and type of contaminants present, and will be readily apparent to those skilled in the art.

In yet another embodiment of the processes of the invention, the processes are operated intermittently. Intermittent operation, as used herein, means (a) that additional treating material(s) is (are) added to existing treating zone(s) either with recovery of the current treating material(s) prior to addition of the new treating material(s) as discussed above or without recovery of the current treating material(s), or (b) that the direct electric current which provides the driving force for the electrokinetic process is alternated in an on/off operation to provide, for example, a residence time for contaminants to be degraded in the treating zones, e.g. by biodegradation, before additional contaminants are moved into the treating zones.

In still another embodiment of the processes of the invention, additional liquid permeable regions, and subsequently treating zones, are formed at a time after initiation of the in-situ remediation to do additional treatment of the contaminated soil region. An example of utilizing treating zones formed after initiation of the in-situ remediation is the situation where the original treating zones are used to trap a contaminant which would be toxic to a treating material, e.g. microorganism, if that treating material were present initially.

Hydraulic fracturing is a method to access subsurface soil for remediation purposes. The fracturing of subterranean formations is accomplished by injecting or pumping a fracturing fluid through a wellbore at a sufficient rate and pressure to cause a fracture to form in the formation, i.e. the contaminated soil region. The fracturing fluid is typically viscosified with a gel, e.g. a water-soluble natural or synthetic polymer. Examples of water-soluble polymers include, but are not limited to, guar, hydroxypropyl guar, carboxy-methylhydroxypropyl guar, methylcellulose and hydroxyethylcellulose.

Hydraulic fracturing can be accomplished by any conventional method known to those skilled in the art, such as those disclosed in U.S. Pat No. 4,964,466, U.S. Pat. No. 4,378,845, and U.S. Pat. No. 4,067,389. For example, after notching the bottom of a well with a water jet, a guar gum matrix with a granular material, preferably sand, suspended in it is added under sufficient pressure until a pancake-shaped fracture is created. An enzyme is added to break down the guar gum matrix, which can then be pumped back out, leaving a sand lens. These fractures can be stacked as close as 20 cm (8 inches). Nutrients, microorganisms, oxidants, catalysts, adsorbents and/or surfactants can be delivered into the sand lenses, i.e. fractures, to form treating zones for degrading the toxic materials present in the contaminated soil region according to the processes of the invention. The granular material is generally referred to as a proppant and is necessary to keep the fracture from closing after the water-soluble polymer is broken down and removed.

An improved method of hydraulic fracturing replaces the conventional fracturing fluid with a fracturing fluid comprising an aqueous transport medium and a natural organic material as the proppant. As used herein, the term "natural organic material" are materials which provide excellent surfaces for microbial attachment as well as a long-term source of nutrient supplements for the microorganisms to grow. The diverse organic makeup of these materials may also assist the biodegradation of chlorinated organic compounds, which may require the presence of certain co-metabolites for rapid degradation. Examples of natural organic material include, but are not limited to, sawdust, wood chips, mulch, compost, and the like, and mixtures thereof.

The use of natural organic material as the proppant has several advantages over the use of sand as the proppant. Among these advantages are (1) elimination of the requirement to use a viscosifying agent, e.g. a water-soluble polymer such as the examples given above, and optionally a crosslinking agent, and (2) elimination of the requirement that the polymer matrix be broken down and removed from the fractures by injecting an enzyme or an oxidizing agent, e.g. calcium or sodium hypochlorite and sodium or ammonium persulfate, that attack the polymer matrix or by thermal degradation depending on the temperature in the fracture. In breaking down the polymer matrix, enzymes are typically useful up to a temperature of about 50° C., oxidizing agents are typically useful up to a temperature of about 80° C., and heat alone is typically useful at temperatures above about 135° C. In addition, the natural organic material acts as (a) a support material for the microorganisms in the fractures, (b) a supplemental or alternative nutrient source for the microorganisms, and (c) a moisture storage reservoir which is beneficial to both microbial activity and the electroosmosis process.

The fracturing of subterranean formations using the improved fracturing fluid is accomplished by injecting or pumping the fracturing fluid comprising an aqueous transport medium and a natural organic material through a wellbore at a sufficient flow rate and under sufficient pressure to fracture the subterranean formation, i.e. the contaminated soil region. The hydraulic fracturing fluid comprises an aqueous transport medium and a sufficient amount of natural organic proppant particles suspended in said medium. The amount of natural organic proppant particles necessary is the amount necessary to form the fracture and keep the fracture from closing after the fracture is formed. The amount of fracturing fluid and natural organic proppant particles necessary would be clear to one skilled in the art of hydraulic fracturing using any of the conventional methods known to those skilled in the art. The aqueous transport medium can contain any chemical used in conventional fracturing fluids other than the water-soluble polymers used as viscosifying agents. Specific chemicals used in fracturing fluids include those disclosed in Chemicals in Petroleum Exploration and Production II, North American Report and Forecasts to 1993, Colin A. Houston and Associates, Inc., Mamaroneck, N.Y. (1984). The aqueous transport medium can also contain the treating materials useful in the processes of the invention.

Pneumatic fracturing is a method to access subsurface soil for remediation purposes. The fracturing of subterranean formations is accomplished by injecting a compressed gas, e.g. air, source through a wellbore at a sufficient rate and pressure to cause a fracture to form in the formation, i.e. the contaminated soil region. The process consists of introducing the high-pressure gas down the borehole through an injector. The pressured media creates air flow channels emanating from the injection point and forms liquid permeable regions or fractures having a radius of influence up to forty feet from the wellbore.

Impulse fracturing is another method to access subsurface soil for remediation purposes. The fracturing of subterranean formations is accomplished with pulses of water generated by a Hydraulic Impulse Device (HID). The HID is a high-pressure hydraulic intensifier that discharges a 0.5 liter slug of fluid in a few tenths of a second. The fluid is discharged through a nozzle that can be inserted into a borehole and fires into the surrounding formation. Injection pressure increases sharply to 8500 psi (58 MPa) in 12 milliseconds and then decreases to atmospheric during the following 275 milliseconds. Velocity of the fluids at the leading edge of the impulse are on the order of 150 to 450 m/sec. Sand is introduced into the fluid phase and carried into the fracture created by the impulse. The general deformation created by a single impulse includes a cylindrical hole and fractures either parallel or normal to the axis of the hole. Additional impulses enlarge the fractures, producing liquid permeable regions.

Impulse fracturing can be performed in both over-consolidated and normally consolidated soils, whereas hydraulic fracturing is better suited for overconsolidated soils (fractures created in normally consolidated soils usually propagate vertically and intersect the ground surface). In addition, impulse fractures can be created near underground utilities and in the vicinity of structures that may be detrimentally affected by the surface deformation associated with hydraulic fractures.

Sheet piling is a method that involves driving lengths of connectable sheet piling material, e.g. steel, into the ground. The lengths of sheet piling material can be connected by any conventional means, such as with slotted connections, ball and socket type connections or interlocking joints. If the sheet piling material is to remain in the soil during treatment, the preferred connection means is the interlocking joint that incorporates a cavity that is filled with a sealant after driving to prevent leakage through the joints. The sheet pilings can be driven to depths of 100 ft (30 m) or more in unconsolidated deposits lacking boulders.

The sheet piling material is driven into the ground by use of a pile hammer. The types of pile hammers include drop, single-acting steam, double-acting steam, diesel, vibratory and hydraulic. For each type of hammer listed the driving energy is supplied by a falling mass which strikes the top of the pile. The piles are driven to their desired depth, i.e. to a point below the contaminated soil region, and the remaining above ground portion can optionally be cut off.

Sheet piling can be used in a number of ways to form treating zones. There are two ways of utilizing sheet pilings: (a) the sheets can remain in the ground, and (b) the sheets can be removed after formation of the treating zone. Regarding the case where the sheets remain, one method involves the use of a single sheet with gates containing the materials for treatment, such that the gates are treating zones. Another method for using a single sheet involves sheet materials impregnated with or containing treating materials which are permeable to flow during electroosmosis. If two sheets are used and the soil between the sheets removed and replaced with treating material, the sheets will contain some means for permitting flow through the sheets such as those discussed above. Regarding the case where the sheets are removed after formation of the treating zone, the sheets will be driven into the contaminated soil region to the desired depth essentially parallel to each other and the soil between the sheets removed to form a liquid permeable region of the desired size. The liquid permeable region will then be filled with the desired treating materials to form the treating zone and the sheets then removed from the soil.

Trench formation is a method that involves excavating soil to a sufficient depth at least as deep as the depth of the contaminated soil region. The trench also will typically be excavated so that it extends laterally as far as is necessary to ensure that all of the contaminated soil region is covered. If multiple trenches are used, they may each extend laterally to cover the entire contaminated soil region or they may overlap as long as the entire width of the contaminated soil region is provided with sufficient treating zones to treat the contaminants. The excavated trench is then filled with a filling material containing the material for treating the contaminants in the contaminated soil region. In one embodiment, the trench can be filled with a slurry that contains material for treating the contaminants in the contaminated soil region provided that the slurry wall formed is permeable to the flow of liquid during the electroosmosis portion of the processes of the invention.

Directional drilling is a method that involves utilization of a compact, omni-directional drilling system which is readily mobilized and can create bores from vertical to horizontal. A walk-over type of locator system is used to provide information on the depth, pitch and roll of the drillhead while drilling. Directional drilling can be used in most soils and can be used to create multiple channels, i.e. liquid permeable regions, of substantial length that can be directed within the contaminated soil region. In addition, directional drilling can be used in combination with other methods of forming liquid permeable regions which utilize a borehole, e.g. hydraulic fracturing. Directional drilling is particularly useful in forming liquid permeable regions below existing structures, e.g. buildings, on the surface or below underground storage tanks.

Soil drilling/mixing is a method for forming continuous treating zones that involves utilizing soil drilling equipment which drills and simultaneously mixes soil with treating materials to form a treating zone comprising a relatively uniform mixture of soil treating material. Soil drilling/mixing can be accomplished by any conventional method known to those skilled in the art. The method of soil drilling/mixing which is currently preferred utilizes a soil drilling apparatus as disclosed in U.S. Pat. No. 5,135,058, which is incorporated by reference herein. Such a soil drilling apparatus is commercially available from RUST Remedial Services under the trademark MecTool ™. Uniform mixing during the formation of the treating zone using the above apparatus is accomplished by the high torque applied to the mixing tool by the drill assembly. The treating material, in the form of a slurry, liquid or gas, is injected directly into the solid soil matrix at pressures up to 150 psi, and mixed in-situ with the soil. This uniform mixing coupled with the rotary and vertical movements of the injection/mixing tool, provides for the effective penetration and mixing of the treating material with the inplace soil.

The treating materials useful in the processes of the invention can be selected from the group consisting of microorganisms, nutrients, electron acceptors, catalysts, adsorbents, surfactants, electron donors, co-metabolites, chelating agents, ion exchange resins, buffers, salts and combinations thereof. When there are more than one liquid permeable regions utilized in the processes of the invention, the treating material(s) added to each liquid permeable region can be the same or different. If only one liquid permeable region is utilized in the processes of the invention, generally at least one treating material in addition to surfactants will be used unless indigenous microorganisms or pre-existing treatment materials are present in the contaminated soil region. The choice of treating materials will depend on the specific contaminated soil region and the specific organic contaminants in the contaminated soil region.

The microorganisms useful in the processes of the invention will depend on the specific organic contaminants in the contaminated soil region to be bioremediated. The biodegradation can be conducted under aerobic conditions, anaerobic conditions or a combination of aerobic and anaerobic conditions. Depending on the type and number of organic contaminants present in the contaminated soil region, a single type of microorganism or a mixture of different microorganisms may be required. The specific microorganisms required to treat each organic contaminant present are well known to those skilled in the art.

The electron acceptors, i.e. oxidants, useful in the processes of the invention will depend on the specific contaminants in the contaminated soil region to be treated and microorganisms used. Examples of suitable oxidants include, but are not limited to, air, hydrogen peroxide, solid oxidants, and the like, and mixtures thereof. The type of oxidant required is well known to those skilled in the art depending on the specific contaminants present.

The catalysts useful in the processes of the invention will depend on the specific contaminants present in the contaminated soil region to be treated. Examples of suitable catalysts include, but are not limited to, iron catalysts, alumina, and the like, and mixtures thereof. The type of catalyst required is well known to those skilled in the art depending on the specific contaminants present.

The adsorbents useful in the processes of the invention will depend on the specific contaminants present in the contaminated soil region to be treated. Examples of suitable adsorbents include, but are not limited to, activated carbon, alumina, polymeric resins, and the like, and mixtures thereof. The type of adsorbent required is well known to those skilled in the art depending on the specific contaminants present. In addition to binding organic contaminants as they pass through the treating zones, the adsorbents may also serve as a support for the microorganisms used. The benefits of using porous supports in bioreactors are well known to those skilled in the art for liquid waste treatment. It is also possible to utilize the adsorbents to trap the contaminants as they pass through the treating zones wherein the adsorbents or adsorbed contaminants can be later removed from the treating zones, or the adsorbed contaminants can be later degraded in-situ, such as by introducing additional treating materials into the treating zones, or by allowing additional time for degradation to be completed.

The surfactants useful in the processes of the invention will depend on the specific contaminated soil region to be treated. The surfactants of the invention can be nonionic or anionic, preferably nonionic as they will not interfere with electroosmosis, and it is further preferred that the surfactants be biodegradable. Examples of suitable surfactants include, but are not limited to, polyethylene glycols, tert-octylphenol ethoxylates, tert-nonylphenol ethoxylates, primary linear alcohols having 16 to 20 carbon atoms, sodium dodecylsulfate, and mixtures thereof.

The electron donors useful in the processes of the invention will depend on the specific contaminants in the contaminated soil region to be treated and microorganisms used. Examples of suitable electron donors include, but are not limited to, aqueous benzoate solutions, aqueous sulfate solutions and mixtures thereof. The type of electron donor required is well known to those skilled in the art depending on the specific contaminants present. Aqueous benzoate solutions can be formed utilizing sodium benzoate dissolved in water. Aqueous sulfate solutions can be formed utilizing sodium sulfate dissolved in water. Electron donors are particularly useful when used in conjunction with anaerobic biodegradation for reductive dehalogenation of chlorinated ethenes.

The co-metabolites useful in the processes of the invention will depend on the specific contaminants in the contaminated soil region to be treated and microorganisms used. Co-metabolites are compounds that microorganisms, e.g. methanotrophic bacteria, can utilize for a carbon and energy source and in the process also degrade another contaminant present in the contaminated soil region which cannot be effectively degraded by the microorganism alone. Co-metabolites are particularly useful in degrading chlorinated organic compounds. Examples of suitable co-metabolites include, but are not limited to, phenol, methane and mixtures thereof. The type of co-metabolite required is well known to those skilled in the art depending on the specific contaminants present and the specific microorganism used.

The chelating agents useful in the processes of the invention will depend on the specific contaminated soil region to be treated. Chelating agents are particularly useful in cases wherein ionic contaminants are present. Examples of suitable chelating agents include, but are not limited to, hydroxycarboxylic acids such as citric, tartaric and gluconic acid, aminopolycarboxylic acids such as ethylenediaminetetraacetic acid (EDTA) and nitrilotriacetic acid (NTA), polyphosphates such as sodium tripolyphosphate (STPP), polyamines such as triethylenetetramine, phosphonic acids such as ethylenediaminetetra(methylenephosphonic acid) (EDTPO), and mixtures thereof.

The ion exchange resins useful in the processes of the invention will depend on the specific contaminated soil region to be treated. The ion exchange resins can be anionic or cationic exchange resins depending on the contaminant to be treated. The currently preferred ion exchange resins are those in the free acid or free base forms. Examples of suitable ion exchange resins include, but are not limited to, Amberlyst A-21, Amberlyst 15, Amberlite IRC-50 and Amberlite IRA-93 (products of the Rohm & Haas Co.) and Dowex 50 W (product of The Dow Chemical Co.).

The buffers useful in the processes of the invention will depend on the specific contaminated soil region to be treated. Buffers, as used herein, are compounds which act to control the pH of the solution subject to electrokinetics. Buffers can also be utilized to raise the conductivity of the solution subject to electrokinetics. As such, buffers aid in the treatment of contaminants by improving the electroosmotic flow or by permitting electrokinetics to effectively operate at lower voltage gradients. Examples of buffers include, but are not limited to, lime, calcium carbonate, phosphate rock, polyphosphate, and the like, and mixtures thereof.

The salts useful in the processes of the invention will depend on the specific contaminated soil region to be treated. Salts, as used herein, are neutral salt compounds which act to raise the conductivity of the solution subject to electrokinetics. As such, salts aid in the treatment of contaminants by improving the electroosmotic flow or by permitting electrokinetics to effectively operate at lower voltage gradients. Examples of salts include, but are not limited to, calcium sulfate, sodium chloride, calcium chloride, and the like, and mixtures thereof.

Electrochemical degradation of contaminants can be achieved, for example, by preparing at least one liquid permeable region or utilizing at least one existing liquid permeable region which contains an electronically conductive material, e.g. graphite particles, such that the liquid permeable region, located between the first and second electrodes, forms a bipolar electrode in which direct or indirect electrochemical degradation occurs. An example of such an electrochemical degradation is the electrochemical reductive dechlorination of chlorinated compounds, e.g. dichloroethane and trichloroethylene, at the cathode of the bipolar electrode treating zone as the contaminants flow through the treating zones by electroosmosis.

Electrokinetics, e.g. electroosmosis and electromigration, can be accomplished by any conventional method known to those skilled in the art, such as those disclosed in Bruell, C. J. et al., "Electroosmotic Removal of Gasoline Hydrocarbons and TCE from Clay", *J. Environ. Eng.*, Vol. 118, No. 1, pp. 68–83, January/February 1992, Segall, B. A. et al., "Electroosmotic Contaminant-Removal Processes", *J. Environ. Eng.*, Vol 118, No. 1, pp. 84–100, January/February 1992 and Acar, Y. B. et al., "Phenol Removal from Kaolinite by Electrokinetics", *J. Geotech. Eng.*, Vol 118, No. 11, pp. 1837–52, November 1992.

Electroosmosis, i.e. the movement of water in the soil matrix from an anode to a cathode, and electromigration, i.e. the movement of ionic contaminants in the soil matrix in the direction toward the electrode of opposite charge, occurs when a constant, low DC electrical current is applied to electrodes located in the contaminated soil region. A first electrode will be typically located at a first end of the contaminated soil region and a second electrode will be typically located at the opposite end of the contaminated soil region to cause an electroosmotic flow from one electrode to the other. As used herein, the terms "first electrode" and "second electrode" can be a single electrode or a plurality of electrodes located across the contaminated soil region at approximately the same horizontal, vertical or diagonal level in the contaminated soil region depending on whether the treating zones are vertical, horizontal or diagonal with respect to the soil surface. Electrical connections and electrode sizes and materials will vary depending on each particular situation. Selection of electrodes will be apparent to one skilled in the art. When the contaminants in the contaminated soil region are organic compounds, it is currently preferred that the electrodes contain carbon or graphite particles because the carbon or graphite aids in pH buffering of the overall electrokinetic process. It is also currently preferred that the electrodes be open electrodes that permit the ingress or egress of a liquid; an open electrode may also be one which is not itself porous or perforated, but which is located within a perforated container or directly behind a liquid permeable region or zone. In addition, the electrode can also function as a treating zone, e.g. an adsorption zone, wherein the carbon or graphite particles also serve as an adsorbent.

When the treating zones are horizontal, e.g. with hydrofracturing or pneumatic fracturing, a first electrode will be located at or near ground level or above the contaminated soil region, and a second electrode will be located below the first electrode, preferably at the bottom or below the contaminated soil region. When the first electrode is located at ground level, it could simply be a metal screen lying on the ground surface. The second electrode, for example, can be a fracture containing electronically conducting materials such as graphite particles or a mixture of graphite particles and sand formed by injecting a fracturing fluid containing sand and graphite through a second wellbore at a sufficient rate and at a sufficient pressure to form the fracture.

When the treating zones are vertical, e.g. with trench formation or sheet piling, a first electrode will typically be located at one end of the contaminated soil region and a second electrode will typically be located at the opposite end of the contaminated soil region. Suitable electrodes for use with vertical treating zones can, for example, be an electronically conductive rod, pipe or an electronically conductive granular medium, e.g. graphite or a mixture of graphite and sand, in a hole in the soil.

During electroosmosis the treating materials, e.g. microorganisms and/or oxidants, may move from the treating zones into the contaminated soil region such that the degradation of the contaminants may also occur within the contaminated soil region as well as in the treating zones.

In the processes of the invention where water is not added to the contaminated soil region, the water used for the electroosmosis will be groundwater or rainwater, i.e. water supplied to the contaminated soil region can be from an above ground source or from an in ground source outside the contaminated soil region to be treated. If groundwater alone is not sufficient, surfactants can also be introduced into the contaminated soil region to desorb or solubilize the contaminants from the soil. External water is not necessary because the process of the invention utilizes periodic reversal of the electrical polarity on the electrodes to reverse the liquid flow by electroosmosis and the electromigratory movement of ionic contaminants, recycle of electroosmotic flow or utilization of in ground water located outside the contaminated soil region to be treated. It has been found that periodic reversal of flow minimizes the soil drying phenomenon associated with extended electroosmotic operation. This simple back-and-forth flow scheme also results in the liquid having multiple passes through the contaminated soil, each time removing additional contaminants from the soil and delivering them to the treating zones. When this reversal of flow technique is used, the presence of an adsorbent in the treating zones is particularly advantageous. The use of an adsorbent effectively decouples mass transport from reaction or bioremediation. As the liquid passes through the treating zones, the contaminants are adsorbed and held on the sorbent surface where the microorganisms can degrade them at their own pace either during electroosmosis or after electroosmosis if required for more effective treatment. It has also been found that recycle of electroosmotic flow, i.e. water, also minimizes the soil drying phenomenon associated with extended electroosmotic operation.

In the process of the invention where an external liquid comprising water is added to the contaminated soil region, the liquid can be added through an open electrode or at another location within the contaminated soil region. An open electrode is one which permits the flow of a liquid, e.g. water. An open electrode may be one which itself is perforated or porous, such as electronically conductive rods, pipes or granular media to permit the ingress or egress of a liquid; an open electrode may also be one which is not itself perforated, but which is located within a perforated container. The external liquid may also contain surfactants to desorb the contaminants from the soil. The reversal of flow technique or the recycle of electroosmotic flow technique described herein can also be utilized in the process of the invention where a liquid is supplied to the contaminated soil region.

The contaminated soil region will be periodically sampled, such as by taking a core sample, and the soil analyzed to determine if the level of contaminants has been reduced to an acceptable level. When the sample analysis indicates that the contaminant level has fallen to or below the acceptable level, the process of the invention can be stopped.

EXAMPLES

Example 1

The following example demonstrates that (1) electroosmosis can be utilized to remove an organic contaminant from a dense soil and deliver it to a liquid permeable region where it is removed from the solution by an adsorbent, and (2) periodic reversal of electrical polarity minimizes operational complications such as soil drying associated with long-term operation of electroosmosis for soil remediation.

Figure 2:
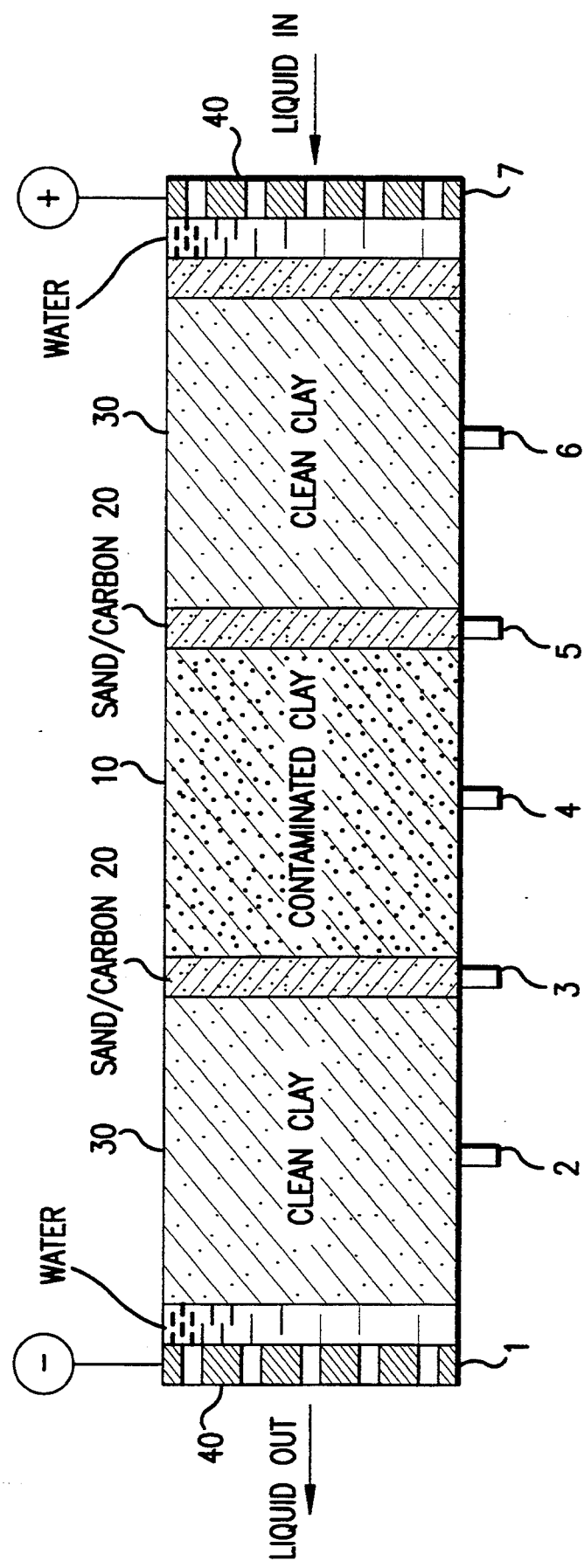
FIG. 2 is a view of the electroosmotic cell set-up used in Examples 1 and 2 under reversed polarity.
Figure 3:
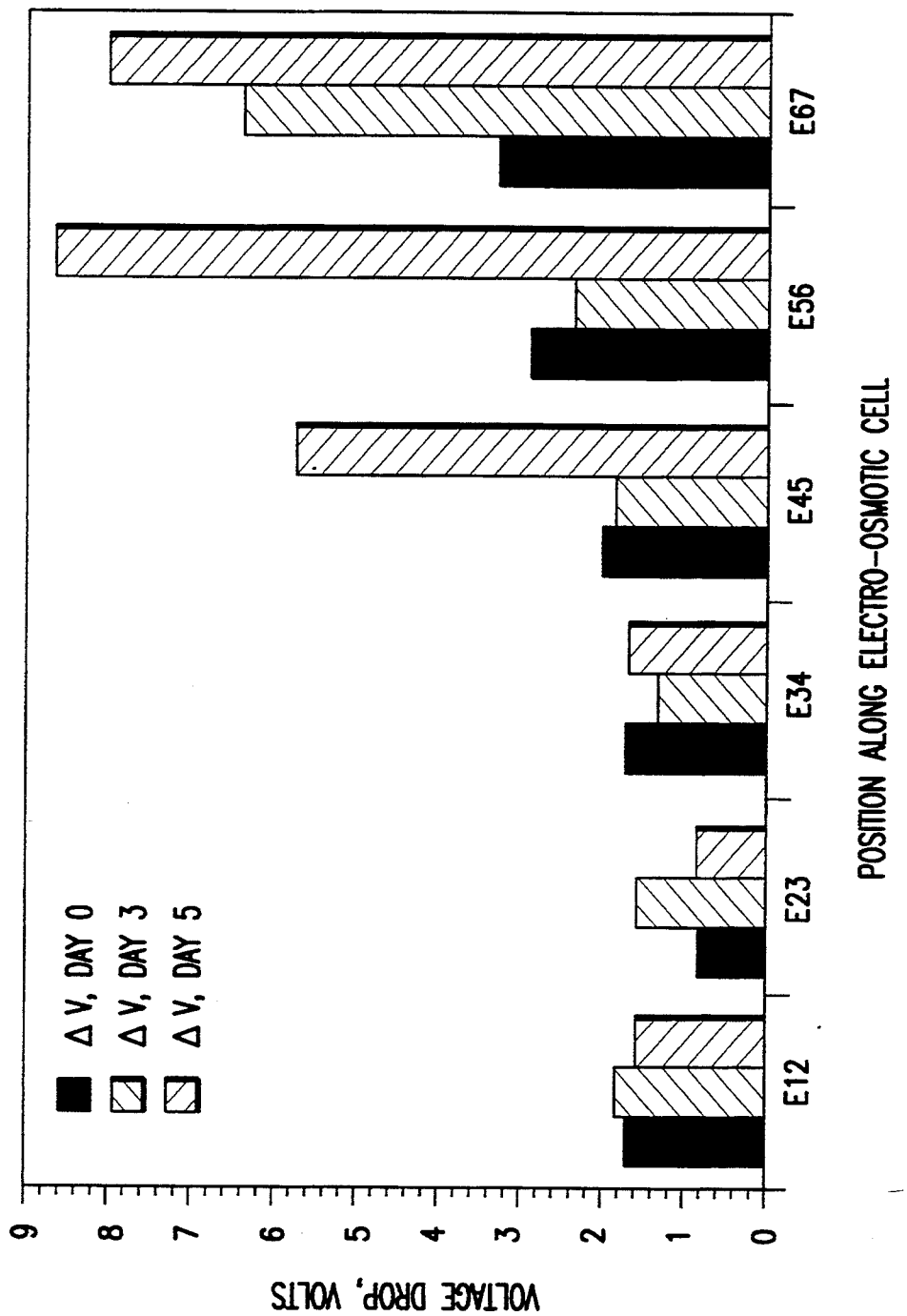
FIG. 3 is a graphical representation of the voltage drop along the electroosmotic cell used in Example 1 under normal polarity and flow.
Figure 4:
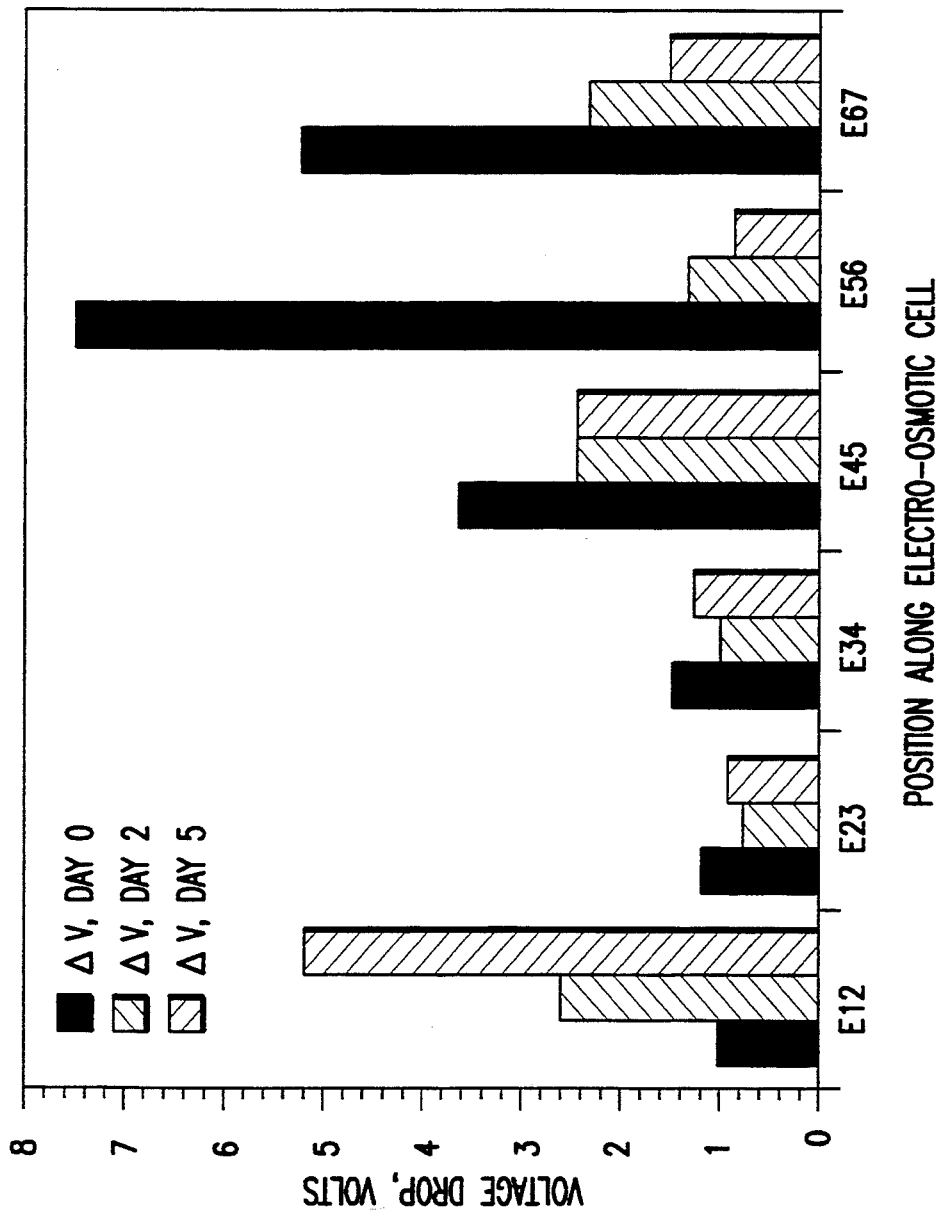
FIG. 4 is a graphical representation of the voltage drop along the electroosmotic cell used in Example 1 under reversed polarity and flow.

The electroosmotic cell set-up used is shown in FIG. 1. The overall length of the packed soil section is 8.5 inches and the diameter of the packed soil section is 4 inches. Packed in the midsection of the cell was kaolinite clay uniformly contaminated with an aqueous solution containing p-nitrophenol (PNP) as the model organic contaminant. Approximately 500 g dry kaolinite clay was mixed with 300 g of an aqueous solution containing 1050 mg PNP/L, which resulted in a clay paste of 37.5 wt % moisture and a loading of 0.39 mg PNP/g wet clay. This PNP-contaminated clay section (10), 2.5 inches long, was bracketed at each end with a layer of sand and carbon particles (20), 0.5 inches long each, (approximately 2.4 % carbon by weight). The carbon used was a commercially available activated carbon found effective for adsorbing PNP. The sand-carbon layers thus represented liquid-permeable adsorption or treating zones. Uncontaminated kaolinite clay (30), 2.5 inches long each, (approximately 38 wt % moisture) was packed next to each sand-carbon layer to simulate clean soil. Well water was used throughout the experiment to simulate groundwater. Porous carbon plates (40) were used as electrodes. The experiment was run continuously for 5 days with the electrical and liquid connections as shown in FIG. 1 (electrode at position of port (1) as anode connected to feed reservoir). After the 5 day period, the electrical and flow connections were reversed as shown in FIG. 2 (electrode at position of port (7) as anode connected to feed reservoir) and the run was carried out continuously for another 5 days. The 5 day time was estimated to be sufficient for water to move from one end of the contaminated clay section to the other. The current was maintained at 3 mA throughout the entire experiment. The individual voltage drops between ports (1) through (7) were measured periodically during the experiment to monitor the conditions of the different soil sections. The results obtained are shown in FIG. 3 and FIG. 4. The results indicate very clearly that near the end of the run in the direction shown in FIG. 1, the voltage gradients near the cathode section were rising steeply, indicating that the clay in those regions was drying out, a potential problem for long-term electroosmosis operation in one direction (see FIG. 3). However, as the current was reversed, as shown in FIG. 2, causing liquid to flow back into those regions of high voltage gradients thereby rewetting them, the voltage gradients returned to normal levels as shown in FIG. 4. Therefore, with periodic electrical polarity reversal, the system is self-correcting and soil drying seems to no longer be a problem for long-term operation of electroosmosis. At the end of the experiment, several small clay samples at different locations in the contaminated clay section, as well as the entire contaminated clay section, were analyzed for PNP. The analysis involved extracting the PNP from the clay samples with 0.1N NaOH solution and measuring the level of PNP in solution by spectrophotometric absorption at 400 nm using a Beckman DU-7 spectrophotometer. One extraction was sufficient to remove all the PNP from the clay. For the carbon, which binds PNP much more tightly, the extraction solution used contained 0.1N NaOH and 2 wt % methylene chloride, and repeated extractions were conducted to maximize PNP recovery. The results show that approximately 97.5% of the initial amount of PNP had been uniformly removed from the contaminated clay with a total power consumption of 21 kwh/m$^3$ of contaminated clay. There was no detectable PNP in the clay section (30) -port #6, and only approximately 0.5% of the initial PNP in the clay section (30) -port #2. The PNP originally loaded on the clay was found effectively bound to the carbon in the two sand-carbon layers.

Example 2

Figure 5:
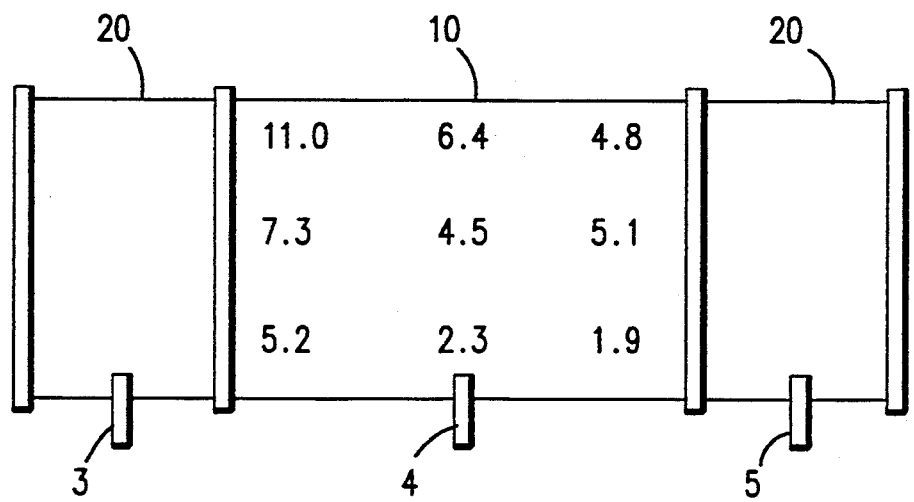
FIG. 5 is a representation of the distribution of the residual PNP (in $\mu g$ PNP/g wet clay) remaining in the contaminated clay section (10) at the end Example 2.
Figure 6:
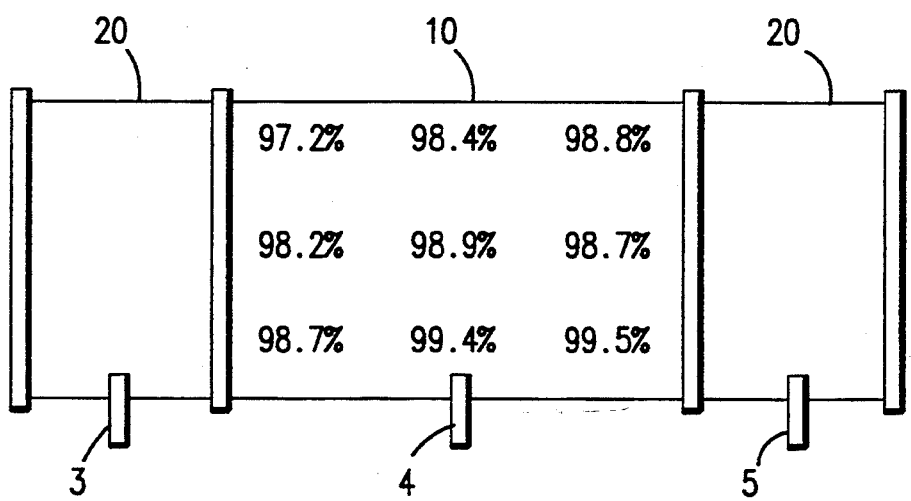
FIG. 6 is a representation of the distribution of PNP as the % removal of PNP throughout the contaminated clay section (10) at the end of Example 2.

Example 1 was repeated except that two complete cycles of electrical polarity and flow reversal were carried out instead of one as in Example 1. One cycle consisted of the electrode at the position of port 1 serving first as anode for a period of time, then as cathode as the flow was reversed. One objective of this experiment was to demonstrate that the electroosmosis system of the invention could function stably with periodic reversal of the electrical polarity and flow. It was found that the periodic reversal actually had a beneficial stabilizing effect on the system operation. In the first cycle, for a constant current of 3 mA, the overall voltage drop between the two electrodes rose to 18–20 volts at the end of 4–5 days of operation, whereas in the second cycle the voltage drop only went up to 12–13 volts at the end of similar periods. At the end of the experiment, several small clay samples at different locations in the contaminated clay section (10) as well as the entire contaminated clay section were analyzed for PNP as in Example 1. The results indicate that approximately 99% of the initial amount of PNP had been uniformly removed from the contaminated clay section (10) with a total power consumption of 31 kwh/m$^3$ of contaminated clay. There was no detectable PNP in the clay sections (30) -ports #2 and #6. The PNP originally loaded on the clay was found effectively bound to the carbon in the two sand-carbon layers (20) -ports #3 and #5. FIG. 5 shows the actual residual concentration of PNP in μg PNP/g wet clay in contaminated clay section (10) at the end of the two cycles. The initial loading of the contaminated clay prepared was 400 μg PNP/g wet clay. FIG. 6 demonstrates the uniform removal of PNP from the contaminated soil section (10) by showing the % removal of PNP throughout the contaminated soil section (10) at the end of the two cycles. A mass balance of the PNP adsorbed by the sand/carbon sections (20) versus that contained originally in the contaminated soil section (10) indicated that the sand/carbon section (20), port #3 contained 104 mg PNP and the sand/carbon section (20), port #5 contained 200 mg PNP. This indicated that 95% of the initial PNP in the contaminated soil section (10) was accounted for in the sand/carbon sections (20).

The following examples utilized an electroosmosis cell set-up similar to that used in Examples 1 and 2 except the electrodes used consisted of packed areas of graphite/activated carbon particles in direct contact with the soils instead of solid plates. These packed electrodes permitted liquid ingress and egress through the electrodes. A further difference consisted of additional clean soil, i.e. clay, sections outside each of the electrode sections.

Example 3

This setup was similar to those coupling electroosmosis with in-situ PNP adsorption but in this case in-situ biodegradation of PNP in the treatment zones was attempted. Solutions containing PNP-degrading microorganisms, a Pseudomonas sp. strain described in Heitkamp et al., *Appl. Environ. Microbio.*, 56:2967–2973 (1990), which is incorporated by reference herein, were injected into the sand/granular activated carbon zones (20) just before start-up. Initial PNP loading in the contaminated clay section (10) was 375 μg/g wet clay (initial loading=285.75 mg PNP). The cell was operated at a constant current of 3 mA for 9 days, 3 days in one direction (0.75 pore volume; 239 g water collected) then 6 days in the opposite direction (1.74 pore volume; 555 g water collected). Humidified air was fed continuously through the treatment zones to provide oxygen for microbial aerobic degradation of PNP. While 98% of the initial PNP was found to be removed from contaminated zone (10) at the end of the run, the total PNP recovered from all areas was 90%, showing that in-situ PNP biodegradation only removed 5–10% of the total PNP removed. No PNP was recovered in either clean clay section (30). The lack of significant PNP degradation was attributed to the inaccessibility of PNP bound inside the pores of the carbon particles to the microbes.

This effect of carbon has been observed in a separate shake flask study.

Example 4

This example is similar to Example 3 except that powdered activated carbon was used to minimize diffusional limitation to PNP degradation. In addition, the microorganisms were cultivated on the powdered carbon prior to packing into the cell to maximize microbial attachment to the carbon surface. Initial PNP loading in section (10) was 384 $\mu$g/g wet clay (initial loading=292 mg PNP). The cell was operated for 8 days, 4 days in one direction (1.1 pore volumes; 357 g water) then reversed for 4 days (0.74 pore volume; 235 g water). 94% of the initial PNP loading was removed from the contaminated clay zone, but only 77% of the total PNP was recovered, clearly demonstrating the in-situ degradation of PNP (degradation rate=8 mg PNP/day). No PNP was recovered in either clean clay section (30). Microbial analysis of the soils in the electroosmotic cell after the run showed very little movement of the PNP-degrading microorganisms from the treatment zones into the surrounding clay soils.

Example 5

This example is similar to Example 3 except that no carbon was added to the treatment zones to eliminate the interference of carbon adsorption to PNP availability to biodegradation. In addition, PNP loading in section (10) was reduced to 86 $\mu$g/g wet clay (initial loading=58.5 mg PNP) to enhance the percentage of PNP loss due to biodegradation. Bacterial solutions (25 mL solution containing $6.9 \times 10^9$ cells/mL were added to each treatment zone) were injected into the sand zones prior to starting up electroosmosis resulting in a cell concentration of $5.3 \times 10^9$ cells/mL solution. The system was operated for 10 days: 3 days in one direction (0.75 pore volumes; 252 g water), then reversed for 5 days (0.99 pore volume; 315.5 g water), then reversed again for 2 days (0.24 pore volume; 77 g water). 90% of the initial PNP loading was removed from the contaminated clay section, but only 13% of the initial PNP was recovered from all areas. Thus, 87% of the initially loaded PNP was lost due to biodegradation (degradation rate$\approx$5.1 mg PNP/day). This is conclusive evidence of the coupling of electroosmotic transport with in-situ biodegradation. Microbial analysis of the soils in the electroosmotic cell after the run detected the presence of PNP-degrading microorganisms throughout, indicating that this microorganism can be fairly mobile under the electric field and that it is able to penetrate clay soil. Thus the nature of the solid surfaces for microbial attachment could play an important role in the spreading of microbes from the injection point in the electroosmosis process.

Example 6

This example is similar to Example 5 except that saw dust instead of sand was used in the treatment zones to investigate the effects of this natural microbial support. Bacterial solutions were mixed with saw dust during packing of the electroosmosis unit. Also the initial PNP D loading was 409 $\mu$g/g wet clay (294 mg PNP). The system was operated for 10 days with polarity reversal after 3 and 7 days [1.5 pore volumes total distributed in the three periods as 0.38 (168 g water), 0.62 (277 g water) and 0.46 (210 g water) pore volumes]. 75% of the initial PNP loading was removed from the contaminated clay zone. A total of 42% of the initial PNP was lost via biodegradation (degradation rate=12 mg PNP/day). One of the two initially clean clay sections (30) was found to contain 2.3% of the initial PNP loading but no PNP was detected in either of the granular carbon electrodes. It should be noted that the initial PNP concentration in solution in the contaminated area was 1064 mg/L, a normally toxic level to microbes in solution. It was observed that saw dust was able to retain water much better than sand, which is beneficial to both microbial activity and the electroosmotic process. Microbial analysis showed that the microorganisms were retained completely in the saw dust areas during the entire experiment; no PNP-degrading microbes were detected in any of the clay sections. This suggests that, like activated carbon, saw dust is a very good support for microbial attachment.

Example 7

This example is similar to that in Example 6 except that the initial PNP loading was 87 $\mu$g/g wet clay (63.6 mg PNP). The system was operated for 12 days with polarity reversal after day 4 [4 days in one direction: 0.56 pore volumes (247 g water); 8 days in opposite direction: 1.1 pore volumes (484 g water)]. 90% PNP removal was obtained in the contaminated zone, 12% recovered in saw dust zones and none in the clean clay zones, resulting in 77% of the initial PNP load lost due to biodegradation (degradation rate$\approx$4 mg PNP/day). In addition, the microbes remained completely in the saw dust regions in this run.

The following example demonstrates the recycle of water from the electroosmotic flow from one electrode to the electrode of opposite charge.

Example 8

This example demonstrates the addition of the total water recycle concept to the standard electroosmosis experiment of PNP-contaminated clay bracketed with sand/carbon adsorption zones. The cathode effluent (alkaline pH) was brought back to the anode zone (acidic pH), thereby accomplishing both total water recycle and pH neutralization. The initial PNP loading was 403 $\mu$g/g wet clay (289 mg PNP). The electroosmosis was initially carried out for 6 days (0.61 pore volumes of contaminated clay; 284 g water) then reversed for an extended period (14 days, 1.7 pore volumes; 805 g water). When the polarity was reversed, the water recycle connections were reversed. During the entire run, the pH's of both sand/carbon zones remained fairly stable between 6 and 6.5. The pH of the cathode effluent went up from 8.5 to 9.5 during the first pass, but settled down to 8–8.5 throughout the second pass. The pH's of the clay samples measured at the end of the run did not show a pattern between the electrode but was lowest near the anode (3.8) and highest (5.2) at the cathode. In between these extremes the values varied from 3.8 to 4.9 with no readily discernable pattern. Conductivity of the cathode effluent seemed to cycle with the polarity reversal, probably reflecting precipitation and redissolution of minerals in the water as a function of pH. 99.4% of the initial PNP loading was removed from the contaminated zone, with 21% of initial load captured in the sand/carbon zone upstream from the contaminated zone (initial direction) and 68% of the initial load captured in the sand/carbon zone downstream of the contaminated zone (initial direction). No PNP was detected in either of the clean clay zones, but an overall material balance accounted for only approximately 90% of the initial PNP load at the end of the run.

Example 9

This example tested the effectiveness of electroosmosis in flushing PNP through clay when granular graphite is used as electrodes with sand zones in front of each electrode for water influent and effluent. In Example 8, water was introduced into and taken out of the cell through granular activated carbon electrodes that were in direct contact with clay. The initial PNP loading was 395 μg/g wet clay (265 mg PNP). Electroosmosis in the new configuration at 1 V/cm was found to remove 99.9% of the PNP from contaminated clay in two passes [total of 2.42 pore volumes, 0.32 pore volume (98 g water) in one day and 2.1 pore volumes (635 g water) in 8 days]. When the polarity was reversed, the direction of the water recycle was reversed. PNP residuals in clay zones were either not detected or were extremely low, i.e. the clean clay zone nearest the cathode at the end of the run contained 0.1% of the initial PNP loading. No PNP was detected in the other clean clay buffer zone. PNP was practically all captured by the sand/carbon zones.

This run demonstrates some "new" characteristics, probably reflecting the different configuration of the cell. The pH gradient profile in the cell measured at the end of the run is certainly steeper, about 2.5 in the anode regions (graphite & sand) and over 11 in the cathode regions. Also, breakthrough of PNP in the effluent was observed, albeit at a very low level, about 1.3% of the initial PNP loading in clay. Thus, activated carbon used as electrodes in previous runs had apparently prevented the breakthrough of PNP in the effluent as well as moderated the pH gradient in the cell by acting as a buffer. Average electroosmosis permeability was about $1.5 \times 10^{-5}$ cm2/V-sec; average electroosmosis transport efficiency about 0.3 cm$^3$/amp-sec; and total power consumption of 26 KWH/m3 contaminated soil for 2.42 pore volumes of flow. The beneficial effects of the polarity reversal were reflected in the responses of flowrate, current, voltage gradients, and pH of the cathode effluent.

The electroosmotic cell used for the following two examples studying the effects of treatment zone spacing was similar to the smaller cell (a plastic tube 4" in diameter) but longer ( approximately 2.5 ft long).

Example 10

In this experiment the treatment zone spacing was increased to 6 inches compared to about 2 to 2.5 in. in the smaller cell. The 2.5 ft cell thus accommodated three adsorption zones (sand/carbon) 6" apart with the two granular carbon electrodes 6" from the outermost sand/carbon treatment zones. The cell contained two PNP contaminated clay zones (6 in. in length) with a sand/carbon zone between the contaminated zones and a sand/carbon zone outside each contaminated zone. As before, the two clay zones between the three treatment zones were uniformly contaminated with PNP at a loading of 419 μg PNP/g wet clay (total initial PNP loading of 1574.6 mg). Electroosmosis was carried out under a constant voltage gradient of 1 V/cm applied across the soil mass. The cell was in the vertical position with the electrodes and zones horizontal with respect to the ground surface. Electroosmotic upflow was carried out for 4 days collecting about 0.6 pore volumes of liquid (486 g water) from the cathode, followed by downflow for 11 days collecting 1.1 pore volumes (875 g water). PNP removal of 97.3% (21.1 mg PNP remaining) and 96.3% (29.2 mg PNP remaining) of the initial PNP loading from the two contaminated zones was achieved. All the PNP removed was captured in the treatment zones; no PNP was detected in the clean clay zones. The upper treatment zone contained 39.9% (568 mg PNP), the middle treatment zone contained 44.8% (637.4 mg PNP) and the lower treatment zone contained 15.3% (217.8 mg PNP) of the PNP recovered by the treatment zones The overall PNP mass balance was 93.6%.

Example 11

The cell set up used was similar to that of Example 10 but with only two treatment zones spaced 12" apart, i.e. a single contaminated clay zone 12" in length. The granular carbon electrodes were each 6" from the treatment zones. Initial PNP loading was 87.5 μg/g wet clay (336.6 mg PNP). Voltage gradient applied=1 V/cm. Electroosmosis was operated downflow for 13 days (0.6 pore volume, 943 g water) then upflow for 23 days (1.1 pore volumes, 1763 g water). 95.8% of the initial PNP loading was removed from the contaminated zone with 19.9% of initial loading trapped in the upper treatment zone and 57.1% of the initial loading trapped in the lower treatment zone. While no PNP was detected in the clean clay zones, only 81.2% of the initial PNP was accounted for in the overall mass balance. It is suspected that the missing PNP was trapped by the carbon electrodes due to their proximity to the treatment zones in this setup.

The following three examples demonstrate the electroosmotic transport and in-situ adsorption of chlorinated hydrocarbons. The analytical method used is as follows.

Analysis Method: Soils were extracted using methanol. The capture zone takes three extractions while the other zones were satisfactorily extracted with a single extraction. The capture zone contains about 5 grams of granular activated carbon which holds dichloroethane (EDC) and trichloroethylene (TCE) quite strongly. Analysis was performed using a Varian 3700 GC with flame ionization and electron capture detectors. Standards were made using EDC and TCE in methanol.

Example 12

The volatile nature of EDC prevents its mixing with clay in the open atmosphere without significant loss. We therefore studied EDC transport through clay soil coupled with in-situ adsorption in the treatment zone by in-situ contamination and analysis. The electroosmotic cell was packed in the center with clay about 5 cm thick, bracketed on one side with a 3 cm thick sand zone (serving as injection zone for introducing EDC into the system) and on the other with a 1 cm thick sand/carbon treatment zone. The sand and sand/carbon zones were followed with clean clay zones then granular carbon electrodes. About 75.6 mg EDC was injected into the sand zone, resulting in a dissolved concentration of about 1000 mg EDC/L water in the sand zone. A constant voltage gradient of 1 V/cm was applied across the electrodes so that the flow direction by electroosmosis was from the contaminated sand zone towards the sand/carbon treatment zone. After 3 days of operation, 475 gm water was collected from the cathode, which is equivalent to 1.5 pore volumes of the middle clay zone. In-situ analysis for EDC in the system was accomplished by flushing the sand zone with water and the sand/carbon zone with methanol then measuring EDC concentrations in the obtained liquids using gas chromatography. The results show that no EDC was left in the sand zone and 75 mg EDC was recovered from the sand/carbon zone, representing a 99% recovery of the initial EDC introduced. This experiment demonstrates that electroosmosis was effective in flushing soluble EDC through clay soil through an adsorptive zone in which EDC was completely trapped.

Example 13

This example is similar to Example 12 except that 1256 mg EDC was injected into the sand zone, which is equivalent to a dissolved concentration of 16,100 mg/L or about twice the solubility of EDC in water (about 8000 mg/L). Thus, a two-phase (organic/water) situation was simulated. Electroosmosis was run for about 0.8 pore volume (275 g water) of the middle clay section, at which time in-situ extraction of the sand/carbon section recovered 62% of the initial EDC loading (779.1 mg). Continued electroosmosis for an additional 1.5 pore volumes (500 g water) resulted in an additional 19.6% recovery of the initial EDC loading (246.4 rag). Analysis of the sand zone shows 8% of the initial EDC loading left. Thus with 2.3 pore volumes of liquid, electroosmosis removed 92% of the EDC from the contaminated sand zone and 81.6% of the total was trapped in the sand/carbon zone. The overall mass balance determined that 90% of the initial EDC was accounted for without measuring EDC in the clay sections.

Example 14

This example utilized the same setup arrangement as in Example 13 but the length of the cell was shorter to accelerate the test (total cell length=12 cm). The test soil zone (kaolin clay) was approximately 3 cm in length, the injection (sand) and capture (sand/carbon) zones were each approximately 1.5 cm in length, and the granular carbon electrodes and dean clay buffer zones were each approximately 1 cm in length. 6.93 mg TCE was introduced into the injection zone by dissolving TCE in water making roughly a 500 mg/L solution. 90.3% of the TCE (5.7 mg) was recovered in the capture zone after 1 pore volume of water (125 mL water) had been moved through the middle clay zone by electroosmosis. 8.7% of the total TCE (0.55 mg) was found in the clay soil and 0.95% of the total TCE (0.06 mg) was left in the injection zone. The overall mass balance for TCE was 91%.

Example 15

This example demonstrates the removal of ionic contaminants from a contaminated soil region using the electrokinetic process of the invention with a chelating agent as the treating material. Copper ion was used as the model ionic contaminant. The cell setup consisted of a copper contaminated clay section bracketed on each end by a resin/sand treatment zone utilizing a trisacryl resin to capture the copper ion by chelation. Outside each resin/sand treatment zone was a zone of clean day and a granular carbon electrode. The initial copper loading in the middle clay section was 37 $\mu$g Cu++/g wet clay with copper being added as $CuSO_4$. Trisacryl resin was mixed with sand in the treatment zones (42.9 wt% and 21.4 wt% resin) with the treatment zone downstream of the contaminated clay zone having the higher loading. The voltage gradient applied across the soil mass was 1 V/cm; the cell was run for 73 hours (1.6 pore volumes liquid obtained) in the same direction without polarity reversal. Utilization of electrokinetics on the $CuSO_4$ contaminated clay was found to remove 41% of the loaded Cu++. There was a distinct concentration gradient of copper in the contaminated clay from the upstream end to the downstream end, the direction of the electrokinetic flow: 4 $\mu$g/g soil near the upstream end to 15 in the middle and 43 near the downstream end. This suggests that electrokinetics was definitely moving copper from clay, and a longer run time would have removed more copper from the contaminated section. All of the copper removed from the contaminated day zone was captured by the resin in the resin/sand zone downstream of the contaminated clay zone, thus demonstrating operability of the concept of combining electrokinetics with in-situ sorption for removal of metals from contaminated soils.

The electroosmosis characteristics of the run were as follows: average flow rate was 6.5 mL/hr; electroosmosis permeability was $2.2 \times 10^{-5}$ $cm^2$/V-sec; electroosmosis transport efficiency starting at 0.2 rising to 0.55 $cm^3$/amp-sec at the end of the run; and total power consumption was 12.7 KWH/m3 contaminated soil at 1.6 pore volumes. pH values of soil and treatment zones measured at the end of the run show that pH's in the soil sections are between 4 and 5, but are much higher in the sand/resin treatment zones (7 for the upstream zone and 7.9 for the downstream zone). This suggests that the resin used was buffering the low pH front coming from the anode, keeping it higher than the surrounding clay, which would slow down the electromigration of copper since low pH is needed to desorb Cu++ from clay. It thus appears necessary to balance the type and amount of chelating agent used with the time taken to flush the metal out of the soil.

Example 16

This example demonstrates the use of electrodes to additionally function as a treating zone. PNP contaminated day (3" in length) was packed in the middle of the electroosmotic cell, bracketed at each end with a ½" packed layer of granular activated carbon as electrode. Clean clay sections outside each electrode, i.e. on the opposite side of the electrode from the contaminated clay section, keep the electrodes in place as well as prevent the liquid from leaking out. PNP loading in the contaminated section was 396 $\mu$g/g wet clay for a total of 379.9 mg PNP. The experiment was carried out at a constant voltage gradient of 1 V/cm (7.6 V total) for about 40 hours, collecting about 350 g water from the cathode, which is equivalent to 0.91 pore volumes of the contaminated clay section.

A very low level of PNP was detected in the effluent from the cathode, about 0.32 mg PNP total or less than 0.1% of the total initial PNP loading. About 92% PNP removal from the contaminated clay was achieved. There was a distinct PNP concentration gradient in the contaminated area in the direction of the electroosmotic flow: 9 $\mu$g PNP/g wet clay near the anode increasing to 54 in the middle to 113 near the cathode. Somewhat incomplete extraction of the cathode carbon (due to the large amount of extraction solution needed) recovered a substantial amount of PNP (about 293 mg PNP or 77% of the total initial PNP loading), demonstrating conclusively that the activated carbon cathode can function both as electrode and adsorption zone. No PNP was detected in either clean clay zones or in the anode. A PNP mass balance based on the amount recovered was over 85%. It is possible that the PNP which was unaccounted for may have been still bound to the cathode due to the incomplete extraction. It is also the possible that some PNP was degraded at the cathode via electrochemical reduction, but this is not conclusive due to the low percentage involved.

That which is claimed is:

1. A process for the in-situ remediation of soil comprising:
   (a) forming at least one liquid permeable region within a contaminated soil region,
   (b) introducing material for treating contaminants in said contaminated soil region selected from the group consisting of microorganisms, nutrients, electron acceptors, catalysts, adsorbents, surfactants, electron donors, co-metabolites, chelating agents, ion exchange resins, buffers, salts and combinations thereof, into said liquid permeable regions to form at least one treating zone within said contaminated soil region, and
   (c) transmitting direct electric current through said contaminated soil region between a first electrode and a second electrode having opposite charge, wherein said first electrode is located at a first end of said contaminated soil region and said second electrode is located at the opposite end of said contaminated soil region (1) to cause an electroosmotic flow from said second electrode to said first electrode, (2) to cause an electromigratory movement of ionic contaminants in a direction toward the electrode of opposite charge, or (3) to cause an electroosmotic flow from said second electrode to said first electrode and an electromigratory movement of ionic contaminants in a direction toward the electrode of opposite charge.

2. The process of claim 1 wherein said direct electric current of (c) causes an electroosmotic flow from said second electrode to said first electrode.

3. The process of claim 1 wherein said direct electric current of (c) causes an electromigratory movement of ionic contaminants in a direction toward the electrode of opposite charge.

4. The process of claim 1 wherein said direct electric current of (c) causes an electroosmotic flow from said second electrode to said first electrode and an electromigratory movement of ionic contaminants in a direction toward the electrode of opposite charge.

5. The process of claim 1 further comprising:
   (d) recycling water from said electroosmotic flow in the direction from said first electrode to said second electrode.

6. The process of claim 1 further comprising:
   (d) supplying a first liquid which comprises water to said contaminated soil region, wherein said direct electric current causes said first liquid to flow by electroosmosis in a direction from said second electrode to said first electrode.

7. The process of claim 1 wherein said treating zones are continuous.

8. The process of claim 7 wherein said continuous treating zone is formed by soil drilling/mixing.

9. The process of claim 1 wherein said liquid permeable regions are formed by a method selected from the group consisting of hydrofracturing pneumatic fracturing, impulse fracturing, directional drilling, sheet piling, trench formation and soil drilling/mixing.

10. The process of claim 9 wherein said liquid permeable regions are fractures formed by hydrofracturing a contaminated soil region by injecting a fracturing fluid through a first wellbore at a sufficient rate and at a sufficient pressure to form at least one fracture in said contaminated soil region.

11. The process of claim 10 wherein said second electrode is located at a depth below said contaminated soil region.

12. The process of claim 11 wherein said second electrode comprises a fracture containing graphite or a mixture of graphite and proppant wherein the fracture is formed by injecting a fracturing fluid containing a mixture of graphite and proppant or graphite through a second wellbore at a sufficient rate and at a sufficient pressure to form the fracture.

13. The process of claim 1 wherein at least one of said treating zones contain an electronically conductive material.

14. The process of claim 1 wherein said soil is clayey or silty.

15. The process of claim 1 wherein said adsorbent is selected from the group consisting of activated carbon, alumina, polymeric resins and mixtures thereof, and said catalyst is selected from the group consisting of iron catalysts, alumina and mixtures thereof.

16. The process of claim 1 wherein said first electrode and said second electrode are each positioned adjacent to a treating zone wherein said adjacent treating zones are between said electrodes and said contaminated soil region to be treated.

17. The process of claim 1 wherein said treating materials are introduced during the formation of said at least one liquid permeable region.

18. A process for the in-situ remediation of soil comprising:
   (a) forming at least one liquid permeable region within a contaminated soil region,
   (b) introducing material for treating contaminants in said contaminated soil region selected from the group consisting of microorganisms, nutrients, electron acceptors, catalysts, adsorbents, surfactants, electron donors, co-metabolites, chelating agents, ion exchange resins, buffers, salts and combinations thereof, into said liquid .permeable regions to form at least one treating zone within said contaminated soil region,
   (c) transmitting direct electric current through said contaminated soil region between a first electrode and a second electrode having opposite charge, wherein said first electrode is located at a first end of said contaminated soil region and said second electrode is located at the opposite end of said contaminated soil region (1) to cause an electroosmotic flow from said second electrode to said first electrode, (2) to cause an electromigratory movement of ionic contaminants in a direction toward the electrode of opposite charge, or (3) to cause an electroosmotic flow from said second electrode to said first electrode and an electromigratory movement of ionic contaminants in a direction toward the electrode of opposite charge, and
   (d) periodically reversing the polarity of said first and second electrodes to reverse the direction of movement of said contaminants through said treating zones.

19. The process of claim 18 wherein step (d) further comprises recycling water from said electroosmotic flow in the direction opposite said electroosmotic flow.

20. A process for the in-situ remediation of soil comprising:
(a) forming at least one liquid permeable region within a contaminated soil region,
(b) introducing material for treating contaminants in said contaminated soil region selected from the group consisting of microorganisms, nutrients, electron acceptors, catalysts, adsorbents, surfactants, electron donors, co-metabolites, chelating agents, ion exchange resins, buffers, salts and combinations thereof, into said liquid permeable regions to form at least one treating zone within said contaminated soil region,
(c) transmitting direct electric current through said contaminated soil region between a first electrode and a second electrode having opposite charge, wherein said first electrode is located at a first end of said contaminated soil region and said second electrode is located at the opposite end of said contaminated soil region (1) to cause an electroosmotic flow from said second electrode to said first electrode, (2) to cause an electromigratory movement of ionic contaminants in a direction toward the electrode of opposite charge, or (3) to cause an electroosmotic flow from said second electrode to said first electrode and an electromigratory movement of ionic contaminants in a direction toward the electrode of opposite charge,
(d) supplying a first liquid which comprises water to said contaminated soil region, wherein said direct electric current causes said first liquid to flow by electroosmosis in a direction from said second electrode to said first electrode, and
(e) (1) periodically reversing the polarity of said first and second electrodes to reverse the direction of movement of said contaminants through said treating zones, (2) recycling the water from said electroosmotic flow from said first electrode to said second electrode, or (3) periodically reversing the polarity of said first and second electrodes to reverse the direction of movement of said contaminants through said treating zones and recycling the water from said electroosmotic flow in the direction opposite said electroosmotic flow.

21. A process for the in-situ remediation of soil comprising:
(a) introducing material for treating contaminants in a contaminated soil region selected from the group consisting of microorganisms, nutrients, electron acceptors, catalysts, adsorbents, surfactants, electron donors, co-metabolites, chelating agents, ion exchange resins, buffers, salts and combinations thereof, into at least one existing liquid permeable region within said contaminated soil region to form at least one treating zone within said contaminated soil region, and
(b) transmitting direct electric current through said contaminated soil region between a first electrode and a second electrode having opposite charge, wherein said first electrode is located at a first end of said contaminated soil region and said second electrode is located at the opposite end of said contaminated soil region (1) to cause an electroosmotic flow from said second electrode to said first electrode, (2) to cause an electromigratory movement of ionic contaminants in a direction toward the electrode of opposite charge, or (3) to cause an electroosmotic flow from said second electrode to said first electrode and an electromigratory movement of ionic contaminants in a direction toward the electrode of opposite charge.

22. The process of claim 21 wherein said direct electric current of (b) causes an electroosmotic flow from said second electrode to said first electrode.

23. The process of claim 21 wherein said direct electric current of (b) causes an electromigratory movement of ionic contaminants in a direction toward the electrode of opposite charge.

24. The process of claim 21 wherein said direct electric current of (b) causes an electroosmotic flow from said second electrode to said first electrode and an electromigratory movement of ionic contaminants in a direction toward the electrode of opposite charge.

25. The process of claim 21 further comprising: (c) recycling water from said electroosmotic flow in the direction from said first electrode to said second electrode.

26. The process of claim 21 further comprising:
(c) supplying a first liquid which comprises water to said contaminated soil region, wherein said direct electric current causes said first liquid to flow by electroosmosis in a direction from said second electrode to said first electrode.

27. The process of claim 21 wherein said treating zones are continuous.

28. The process of claim 27 wherein said continuous treating zone is formed by soil drilling/mixing.

29. The process of claim 21 wherein said liquid permeable regions are formed by a method selected from the group consisting of hydrofracturing, pneumatic fracturing, impulse fracturing, directional drilling, sheet piling, trench formation and soil drilling/mixing.

30. The process of claim 29 wherein said liquid permeable regions are fractures formed by hydrofracturing a contaminated soil region by injecting a fracturing fluid through a first wellbore at a sufficient rate and at a sufficient pressure to form at least one fracture in said contaminated soil region.

31. The process of claim 30 wherein said second electrode is located at a depth below said contaminated soil region.

32. The process of claim 31 wherein said second electrode comprises a fracture containing graphite or a mixture of graphite and proppant wherein the fracture is formed by injecting a fracturing fluid containing a mixture of graphite and proppant or graphite through a second wellbore at a sufficient rate and at a sufficient pressure to form the fracture.

33. The process of claim 21 wherein at least one of said treating zones contain an electronically conductive material.

34. The process of claim 21 wherein said soil is clayey or silty.

35. The process of claim 21 wherein said adsorbent is selected from the group consisting of activated carbon, alumina, polymeric resins and mixtures thereof, and said catalyst is selected from the group consisting of iron catalysts, alumina and mixtures thereof.

36. The process of claim 21 wherein said first electrode and said second electrode are each positioned adjacent to a treating zone wherein said adjacent treating zones are between said electrodes and said contaminated soil region to be treated.

37. A process for the in-situ remediation of soil comprising:
  (a) introducing material for treating contaminants in a contaminated soil region selected from the group consisting of microorganisms, nutrients, electron acceptors, catalysts, adsorbents, surfactants, electron donors, co-metabolites, chelating agents, ion exchange resins, buffers, salts and combinations thereof, into at least one existing liquid permeable region within said contaminated soil region to form at least one treating zone within said contaminated soil region,
  (b) transmitting direct electric current through said contaminated soil region between a first electrode and a second electrode having opposite charge, wherein said first electrode is located at a first end of said contaminated soil region and said second electrode is located at the opposite end of said contaminated soil region (1) to cause an electroosmotic flow from said second electrode to said first electrode, (2) to cause an electromigratory movement of ionic contaminants in a direction toward the electrode of opposite charge, or (3) to cause an electroosmotic flow from said second electrode to said first electrode and an electromigratory movement of ionic contaminants in a direction toward the electrode of opposite charge, and
  (c) periodically reversing the polarity of said first and second electrodes to reverse the direction of movement of said contaminants through said treating zones.

38. The process of claim 37 wherein step (c) further comprises recycling water from said electroosmotic flow in the direction opposite said electroosmotic flow.

39. A process for the in-situ remediation of soil comprising:
  (a) introducing material for treating contaminants, in a contaminated soil region selected from the group consisting of microorganisms, nutrients, electron acceptors, catalysts, adsorbents, surfactants, electron donors, co-metabolites, chelating agents, ion exchange resins, buffers, salts and combinations thereof, into at least one existing liquid permeable region within said contaminated soil region to form at least one treating zone within said contaminated soil region,
  (b) transmitting direct electric current through said contaminated soil region between a first electrode and a second electrode having opposite charge, wherein said first electrode is located at a first end of said contaminated soil region and said second electrode is located at the opposite end of said contaminated soil region (1) to cause an electroosmotic flow from said second electrode to said first electrode, (2) to cause an electromigratory movement of ionic contaminants in a direction toward the electrode of opposite charge, or (3) to cause an electroosmotic flow from said second electrode to said first electrode and an electromigratory movement of ionic contaminants in a direction toward the electrode of opposite charge,
  (c) supplying a first liquid which comprises water to said contaminated soil region, wherein said direct electric current causes said first liquid to flow by electroosmosis in a direction from said second electrode to said first electrode, and
  (d) (1) periodically reversing the polarity of said first and second electrodes to reverse the direction of movement of said contaminants through said treating zones, (2) recycling the water from said electroosmotic flow from said first electrode to said second electrode, or (3) periodically reversing the polarity of said first and second electrodes to reverse the direction of movement of said contaminants through said treating zones and recycling the water from said electroosmotic flow in the direction opposite said electroosmotic flow.

40. A process for the in-situ remediation of soil comprising:
  (a) transmitting direct electric current through said contaminated soil region between a first electrode and a second electrode having opposite charge, wherein said first electrode is located at a first end of said contaminated soil region and said second electrode is located at the opposite end of said contaminated soil region (1) to cause an electroosmotic flow from said second electrode to said first electrode, (2) to cause an electromigratory movement of ionic contaminants in a direction toward the electrode of opposite charge, or (3) to cause an electroosmotic flow from said second electrode to said first electrode and an electromigratory movement of ionic contaminants in a direction toward the electrode of opposite charge, wherein said contaminated soil region contains at least one existing liquid permeable region and said at least one existing liquid permeable region contains existing treating materials; and
  (b) periodically reversing the polarity of said first and second electrodes to reverse the direction of movement of said contaminants through said existing treating zones.

41. The process of claim 40 further comprising:
  (d) recycling water from said electroosmotic flow in the direction from said first electrode to said second electrode.

* * * * *